United States Patent
Liu et al.

(10) Patent No.: US 11,721,261 B2
(45) Date of Patent: Aug. 8, 2023

(54) DISPLAY PANEL, METHODFOR DRIVING THE SAME AND DISPLAY DEVICE

(71) Applicant: Wuhan Tianma Microelectronics Co., Ltd., Wuhan (CN)

(72) Inventors: Xigang Liu, Wuhan (CN); Huijun Jin, Wuhan (CN); Chao Dai, Wuhan (CN); Benshun Zhong, Wuhan (CN)

(73) Assignee: Wuhan Tianma Microelectronics Co., Ltd., Wuhan (CN)

( * ) Notice: Subject to any disclaimer, the term of this patent is extended or adjusted under 35 U.S.C. 154(b) by 0 days.

(21) Appl. No.: 17/723,731

(22) Filed: Apr. 19, 2022

(65) Prior Publication Data

US 2022/0238056 A1 Jul. 28, 2022

(30) Foreign Application Priority Data

Sep. 30, 2021 (CN) .......................... 202111165712.5

(51) Int. Cl.
  *G09G 3/20* (2006.01)
  *G06F 3/041* (2006.01)
  *G06F 3/044* (2006.01)

(52) U.S. Cl.
  CPC .............. *G09G 3/20* (2013.01); *G06F 3/044* (2013.01); *G06F 3/04166* (2019.05); *G09G 2310/0286* (2013.01); *G09G 2310/08* (2013.01)

(58) Field of Classification Search
  CPC ................ G06F 3/04166; G06F 3/044; G09G 2310/0286; G09G 2310/08; G09G 3/20
  See application file for complete search history.

(56) References Cited

U.S. PATENT DOCUMENTS

| | | | |
|---|---|---|---|
| 2015/0346904 A1* | 12/2015 | Long ..................... | G06F 3/0412 377/64 |
| 2018/0286302 A1* | 10/2018 | Feng .................... | G09G 3/3677 |
| 2018/0329547 A1* | 11/2018 | Wu ........................ | G06F 3/0412 |
| 2019/0114013 A1* | 4/2019 | Wu ..................... | G06F 3/04166 |
| 2021/0335301 A1* | 10/2021 | Liang .................. | G06F 3/04166 |

FOREIGN PATENT DOCUMENTS

| | | |
|---|---|---|
| CN | 103996370 A | 8/2014 |
| CN | 106898287 A | 6/2017 |
| CN | 109656397 A | 4/2019 |

* cited by examiner

*Primary Examiner* — Hong Zhou
(74) *Attorney, Agent, or Firm* — KDW Firm PLLC

(57) ABSTRACT

Provided are a display panel, a method for the same and a display device. In the display panel, in a same shift register unit of a shift register circuit, a pull-down module is electrically connected to a first node, a second node, a first level signal terminal, and a signal output terminal separately. The pull-down module transmits a first level signal of the first level signal terminal to the second node and the signal output terminal under the control of a potential of the first node. The pull-down module includes at least a first transistor. A gate of the first transistor is electrically connected to the first node; the pull-down control module is electrically connected to the first node and the scanning control terminal separately; and the pull-down control module controls a scanning control signal of the scanning control terminal to be transmitted to the first node.

17 Claims, 17 Drawing Sheets

DISPLAY PANEL, METHOD FOR DRIVING THE SAME AND DISPLAY DEVICE

CROSS-REFERENCE TO RELATED APPLICATION

This application claims priority to Chinese Patent Application No. 202111165712.5 filed Sep. 30, 2021, the disclosure of which is incorporated herein by reference in its entirety.

TECHNICAL FIELD

Embodiments of the present disclosure relate to the field of display technologies and, in particular, to a display panel, a method for driving the same and a display device.

BACKGROUND

With the development of display technologies, the integration degree of the display panel is getting higher and higher, and the cost is getting lower and lower. For a gate driver on array (GOA) technology, it is used for integrating the gate driving circuit into a peripheral area of the array substrate, thereby effectively improving the integration degree of the display device and reducing the manufacturing cost thereof while achieving a narrow bezel design.

When the related display panel is working in a high-temperature and high-humidity environment, its GOA circuit may output abnormally, resulting in G-line jitter in the display panel.

SUMMARY

In view of the above problems, embodiments of the present disclosure provide a display panel, a method for driving the same and a display device, so that when the display panel works in a high-temperature and high-humidity environment, it can be ensured that a normal scanning signal is output from a shift register circuit of the display panel, improving the display quality of the display panel.

In a first aspect, embodiments of the present disclosure provide a display panel. The display panel includes a display area and a non-display area. Multiple scanning signal lines are provided in the display area, and t a shift register circuit is provided in the non-display area. The shift register circuit includes multiple cascaded shift register unit.

Each of the plurality of shift register units comprises a scanning control terminal, a signal output terminal, a first level signal terminal, a pull-down module and a pull-down control module;

In a same shift register unit, the pull-down module is electrically connected to a first node, a second node, the first level signal terminal and the signal output terminal separately; the pull-down module is configured to transmit a first level signal of the first level signal terminal to the second node and the signal output terminal under the control of a potential of the first node; the pull-down module comprises at least a first transistor; a gate of the first transistor is electrically connected to the first node; the pull-down control module is electrically connected to the first node and the scanning control terminal separately; and the pull-down control module is configured to control a scanning control signal of the scanning control terminal to be transmitted to the first node.

In a scanning phase of a frame, the scanning control signal is at an enable level controlling the first transistor to be turned on; in a non-scanning phase of the frame, the scanning control signal comprises a disable level controlling the first transistor to be turned off.

The signal output terminal of each of the multiple shift register units is electrically connected to a respective one of the multiple scanning signal lines; in the scanning phase, the signal output terminal of each of the multiple shift register units sequentially outputs a scanning signal at an enable level; in a non-scanning phase, the signal output terminal of each of the multiple shift register units outputs a scanning signal at a disable level.

In a second aspect, embodiments of the present disclosure further provides driving method of a display panel, configured to drive the above display panel, where the driving method of the display panel includes multiple frames, and each frame of the multiple frames includes a scanning phase and a non-scanning phase.

In the scanning phase of the frame, an enable level of a scanning control signal is provided for the scanning control terminal, and a signal output terminal of each shift register unit outputs an enable level of a scanning signal sequentially.

In the non-scanning phase of the frame, a scanning control signal including a disable level is provided for the scanning control terminal, and a signal output terminal of each shift register unit outputs a scanning signal at a disable level.

In a third aspect, an embodiment of the present disclosure further provides a display device. The display device includes a driver chip and the preceding display panel.

The driver chip is configured to execute the driving method of the display panel.

DETAILED DESCRIPTION

Figure 1:
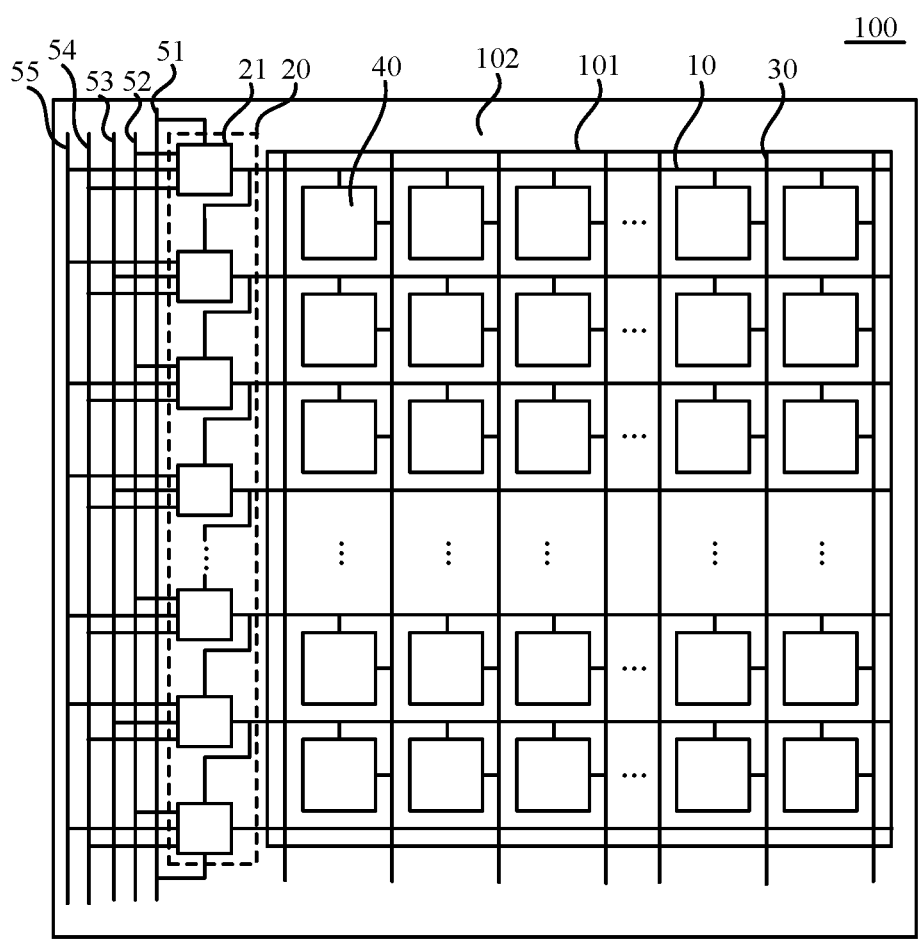
FIG. 1 is a structural diagram of a display panel provided by an embodiment of the present disclosure.

The present disclosure is further described hereinafter in detail in conjunction with drawings and embodiments. It is to be understood that embodiments described hereinafter are intended to explain the present disclosure and not to limit the present disclosure. Additionally, it is to be noted that for ease of description, only part, not all, of structures related to the present disclosure are illustrated in the drawings.

A GOA circuit usually includes multiple cascaded shift register units, an output terminal of each shift register unit is electrically connected to a respective scanning signal line, and sequentially outputs a scanning signal at an enable level to the respective scanning signal line to achieve a progressive scanning function, so that the display panel shows a corresponding display image. In the related art, a time for displaying one display frame is one frame. In one part of the one frame, each shift register unit sequentially output a scanning signal at an enable level, that is, the one part is a scanning phase of the frame; and in another part of the one frame, each shift register unit continuously outputs a scanning signal at a disable level, that is, the another part is a non-scanning phase of the frame. In this non-scanning phase, both a signal output terminal of each shift register unit and a node electrically connected to the signal output terminal should be maintained at the disable level of the scanning signal.

However, since the signal output terminal and the transistor electrically connected to the corresponding node have an inherent leakage current, the signal output terminal and the corresponding node in each shift register unit cannot be maintained at the disable level of the scanning signal, causing potentials at the signal output terminal and the corresponding node to drift, and when a scanning frequency is low, a duration of the non-scanning phase is relatively long, resulting in more obvious influence of the leakage current on the scanning signal output by the shift register unit. Especially, in a high-temperature and/or high-humidity environment, internal carriers in the transistor are relatively high in activity, and drifting of characteristics of the transistor has more obvious influence on the potentials at the signal output terminal and the node associated with the signal output terminal, so that the phenomenon of output abnormality of the shift register units is more obvious, thereby affecting the normal display of a next frame, and thus affecting the display quality of the display panel.

To solve the above technical problems, embodiments of the present disclosure provide a display panel. The display panel includes a display area and a non-display area. Multiple scanning signal lines are provided in the display area, and a shift register circuit is provided in the non-display area. The shift register circuit includes multiple cascaded shift register units. Each shift register unit includes a scanning control terminal, a signal output terminal, a first level signal terminal, a pull-down module and a pull-down control module. In the same shift register unit, the pull-down module is electrically connected to a first node, a second node, the first level signal terminal and the signal output terminal separately. The pull-down module is configured to transmit a first level signal of the first level signal terminal to the second node and the signal output terminal under the control of a potential of the first node. The pull-down module includes at least a first transistor. A gate of the first transistor is electrically connected to the first node; the pull-down control module is electrically connected to the first node and the scanning control terminal separately; and the pull-down control module is configured to control a scanning control signal of the scanning control terminal to be transmitted to the first node. In a scanning phase of a frame, the scanning control signal is at an enable level controlling the first transistor to be turned on; and in a non-scanning phase of the frame, the scanning control signal includes a disable level controlling the first transistor to be turned off, where the signal output terminal of each shift register unit is electrically connected to a respective scanning signal line. In the scanning phase, the signal output terminal of each shift register unit sequentially outputs a scanning signal at an enable level; and in a non-scanning phase, the signal output terminal of each shift register unit outputs a scanning signal at a disable level.

In the above technical solution, in the scanning phase of the frame, the scanning control signal of the scanning control terminal is maintained at the enable level, so that the first transistor can be turned on as necessary to ensure that each shift register unit can sequentially output the scanning signal at the enable level to the respective scanning signal line, thereby achieving the progressive scanning function; and in the non-scanning phase of the frame, the scanning control signal of the scanning control terminal includes the disable level capable of controlling the first transistor to be turned off, so that in a case where the first transistor is in an off state, the leakage current are not allowed to pass through the first transistor to reduce a discharge amount of the first transistor to the second node and/or the signal output terminal and reduce a loss amount of charges at the second node and/or the signal output terminal, ensuring that the scanning signal output from the signal output terminal of each shift register unit in the non-scanning phase can be maintained at the disable level for a long time, avoiding the output abnormality of the signal output terminal of each shift register unit, and further improving the display quality of the display panel.

The preceding is the core idea of the present disclosure. Based on the embodiments of the present disclosure, all other embodiments obtained by those of ordinary skill in the art without creative work are within the scope of the present disclosure. Technical solutions in embodiments of the present disclosure are described clearly and completely hereinafter in conjunction with the drawings in the embodiments of the present disclosure.

Figure 2:
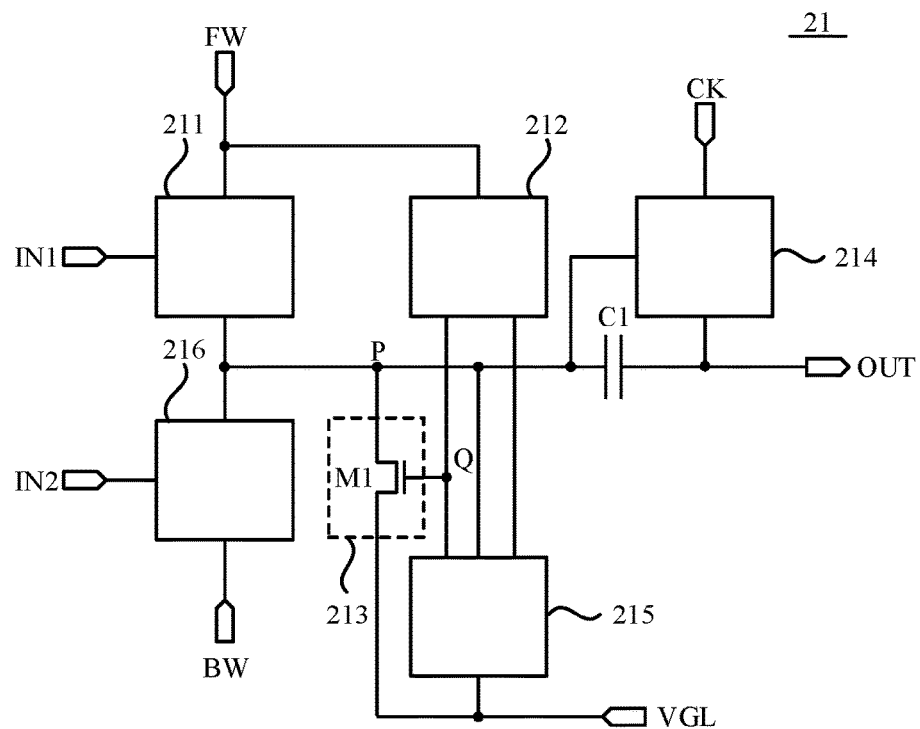
FIG. 2 is a structural diagram of a shift register unit provided by an embodiment of the present disclosure.

FIG. 1 is a structural diagram of a display panel provided by an embodiment of the present disclosure. FIG. 2 is a structural diagram of a shift register unit provided by an embodiment of the present disclosure. Referring to FIGS. 1 and 2, the display panel 100 includes a display area 101 and a non-display area 102. Multiple scanning signal lines 10 are provided in the display area 101, and a shift register circuit 20 is provided in the non-display area 102. The shift register circuit 20 includes multiple cascaded shift register units 21. Each shift register unit 21 includes a scanning control terminal FW, a signal output terminal OUT, a first level signal terminal VGL, a pull-down module 213, and a pull-down control module 212. In the same shift register unit 21, the pull-down module 213 is electrically connected to a first node Q, a second node P, the first level signal terminal VGL and the signal output terminal OUT separately. The pull-down module 213 is configured to transmit a first level signal Vg1 of the first level signal terminal VGL to the second node P and the signal output terminal OUT under the control of a potential of the first node Q. The pull-down module 213 includes at least a first transistor M1; a gate of the first transistor M1 is electrically connected to the first node Q; the pull-down control module 212 is electrically connected to the first node Q and the scanning control terminal FW separately; and the pull-down control module 212 is configured to control a scanning control signal Fw of the scanning control terminal FW to be transmitted to the first node Q, so that the first transistor M1 can be turned on or off under the control of the scanning control signal. At the same time, the signal output terminal OUT of each shift register unit 21 is electrically connected to a respective scanning signal line 10 so as to provide a scanning signal for the respective scanning signal line 10.

Typically, an image showed on the display panel 100 is composed of multiple display frames. With every display frame displayed, the shift register circuit 20 completes one frame, and each frame may include a scanning phase and a non-scanning phase. Since the signal output terminal OUT of each shift register unit 21 is electrically connected to a respective scanning signal line 10, each shift register unit 21 can sequentially output a scanning signal Gout at an enable level to the respective scanning signal line 10 in the scanning phase of the frame, and each shift register unit 21 can continuously output a scanning signal Gout at a disable level to the respective scanning signal line 10 in the non-scanning phase of the frame.

Figure 3:
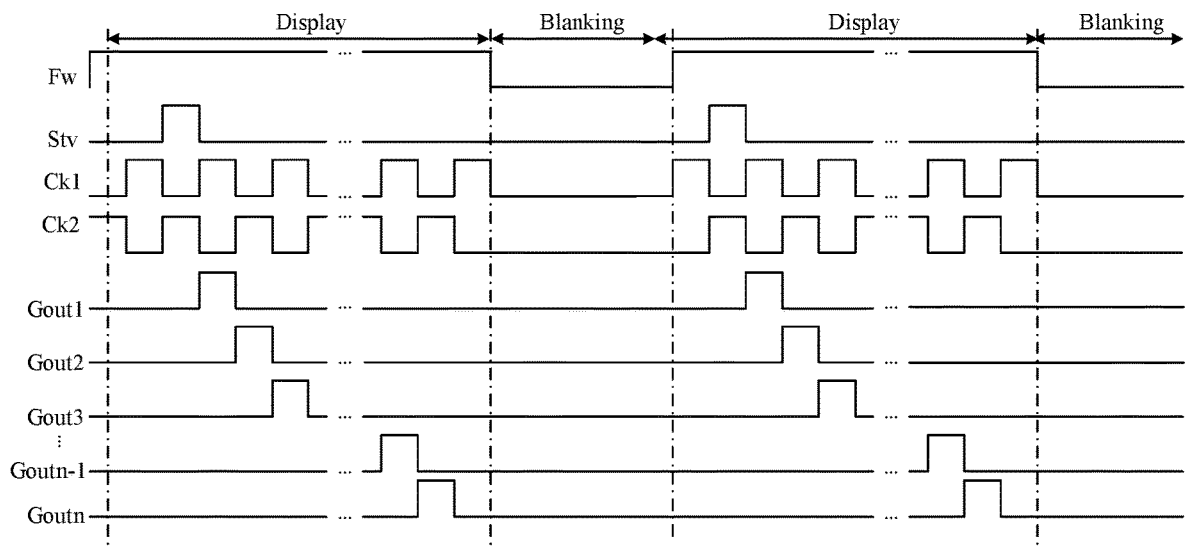
FIG. 3 is a driving timing diagram of a shift register circuit provided by an embodiment of the present disclosure.

Exemplarily, FIG. 3 is a driving timing diagram of a shift register circuit provided by an embodiment of the present disclosure. Referring to FIGS. 1, 2 and 3, the display area 101 of the display panel 100 may further include multiple data signal lines 30 and multiple sub-pixels 40. At least a part of sub-pixels 40 located in a same row share one scanning signal line 10, and at least a part of sub-pixels 40 located in a same column share one data signal line 30, so that when each scanning signal line 10 sequentially transmits a scanning signal Gout at an enable level output from the respective shift register unit 21, a data signal transmitted by each data signal line 30 can be written into the respective sub-pixels 40 to control the respective sub-pixels 40 to display light of a corresponding brightness and color. In this manner, the display panel 100 can show rich and colorful display images. During an image display period of the display panel 100, the display panel may display multiple display frames, i.e., including multiple frames, each frame including the scanning phase Display and the non-scanning phase Blanking. In the scanning phase Display of the frame, the pull-down module 213, the pull-down control module 212 and the like in each shift register unit 21 cooperate to sequentially provide a scanning signal Gout (Gout1, Gout2, Gout3, . . . , Goutn−1 or Goutn) at an enable level to the respective scanning signal line 10; and in the non-scanning phase Blanking of the frame, the pull-down module 213, the pull-down control module 212 and the like in each shift register unit 21 cooperate to provide a scanning signal Gout (Gout1, Gout2, Gout3, . . . , Goutn−1 or Goutn) at a disable level to the respective scanning signal line 10, in which case, the display panel 100 maintains the corresponding display image. The scanning signal Gout at the enable level is a signal which enables the corresponding thin-film transistor in the sub-pixel 40 in the display area 101 to be turned on, and the scanning signal Gout at the disable level is a signal which enables the corresponding thin-film transistor in the sub-pixel 40 of the display area 101 to be turned off. In a case where the thin-film transistor in each sub-pixel in the display panel is an N-type transistor, the enable level of the scanning signal is a high level capable of controlling the N-type transistor to be turned on, and the disable level of the scanning signal is a low level capable of controlling the N-type transistor to be turned off. In a case where the thin-film transistor in each sub-pixel of the display panel is a P-type transistor, the enable level of the scanning signal is a low level capable of controlling the P-type transistor to be turned on, and the disable level of the scanning signal is a high level capable of controlling the P-type transistor to be turned off. For ease of description, the description is given by using an example in which the enable level of the scanning signal Gout is a high level and the disable level of the scanning signal Gout is a low level.

In a case where the first transistor M1 is on, the first level signal Vg1 of the first level signal terminal VGL can be transmitted to the second node P or the signal output terminal OUT through the first transistor M1. In a case where the first transistor M1 is off, the first level signal Vg1 cannot be transmitted to the second node P through the first transistor M1, and a corresponding current path from the second node P to the first level signal terminal VGL through the first transistor M1 cannot be formed. Therefore, if in the non-scanning phase Blanking, the pull-down control module 212 continuously provides a scanning control signal Fw at the enable level of the scanning control terminal FW to the first node Q, the first transistor M1 keeps in an on state in the non-scanning phase Blanking, resulting in that a corresponding current path from the second node P to the first level signal terminal VGL through the first transistor M1 is formed, thereby discharging charges at the signal output terminal OUT and/or the second node P. As a result, the charges at the signal output terminal OUT and/or the second node P of each shift register unit 21 are reduced, and a potential of the scanning signal output from the signal output terminal OUT of the shift register unit 21 drifts to 0V, resulting in that the scanning signal Gout (Gout1, Gout2, Gout3, . . . , Goutn−1 or Goutn) of each shift register unit 21 cannot be maintained at an inherent disable level, thereby affecting a current display frame of the display panel 100 and affecting a next display frame of the display panel 100.

Further referring to FIGS. 1, 2 and 3, in the scanning phase Display of the frame, the scanning control signal Fw of the scanning control terminal FW is configured to be at the enable level capable of controlling the first transistor M1 to be turned on, so that the first transistor M1 can be turned on when the first transistor M1 needs to be turned on, thereby controlling each shift register unit 21 to sequentially output the scanning signal Gout (Gout1, Gout2, Gout3, . . . , Goutn−1 or Goutn) at the enable level. In the non-scanning phase Blanking of the frame, the scanning control signal Fw of the scanning control terminal FW is configured to include the disable level capable of controlling the first transistor M1 to be turned off, so that when the pull-down control module 212 transmits the scanning control terminal FW at the disable level to the first node Q, the first transistor M1 can be in an off state and the corresponding current path from the second node P to the first level signal terminal VGL through the first transistor M1 cannot be formed. In this manner, the charges stored at the signal output terminal OUT and/or the second node P cannot be discharged, and the loss amount of the charges stored at the signal output terminal OUT and/or the second node P is reduced, ensuring that in the non-scanning phase Blanking, the scanning signal Gout (Gout1, Gout2, Gout3, . . . , Goutn−1 or Goutn) output from the signal output terminal of each shift register unit 21 can be maintained at the disable level for a long time, preventing a case where the display panel 100 displays abnormally caused by the abnormality of the scanning signals Gout (Gout1, Gout2, Gout3, . . . , Goutn−1 and Goutn) transmitted by the scanning signal lines 10 in the display area 101 due to the signal output abnormality of the shift register units 20, and thereby further improving the display quality of the display panel 100.

It is to be noted that in a case where the first transistor M1 is a P-type transistor, the enable level of the scanning control signal Fw is a low level, and the disable level of the scanning control signal Fw is a high level; and in a case where the first transistor M1 is a N-type transistor, the enable level of the scanning control signal Fw may be a high level, and the disable level of the scanning control signal Fw may be a low level. For ease of description, the technical solutions in the embodiments of the present disclosure are exemplarily described by using an example in which the enable level of the scanning control signal Fw is a high level and the disable level of the scanning control signal Fw is a low level.

In addition, FIG. 2 is only a diagram exemplarily illustrating the embodiments of the present disclosure. FIG. 2 exemplarily illustrates that the gate of the first transistor M1 is electrically connected to the first node Q, a first pole of the first transistor M1 is electrically connected to the first level signal terminal VGL, and a second pole of the first transistor M1 is electrically connected to the second node P, and in the embodiments of the present disclosure, the connection manner of the first transistor M1 is not limited thereto.

Figure 4:
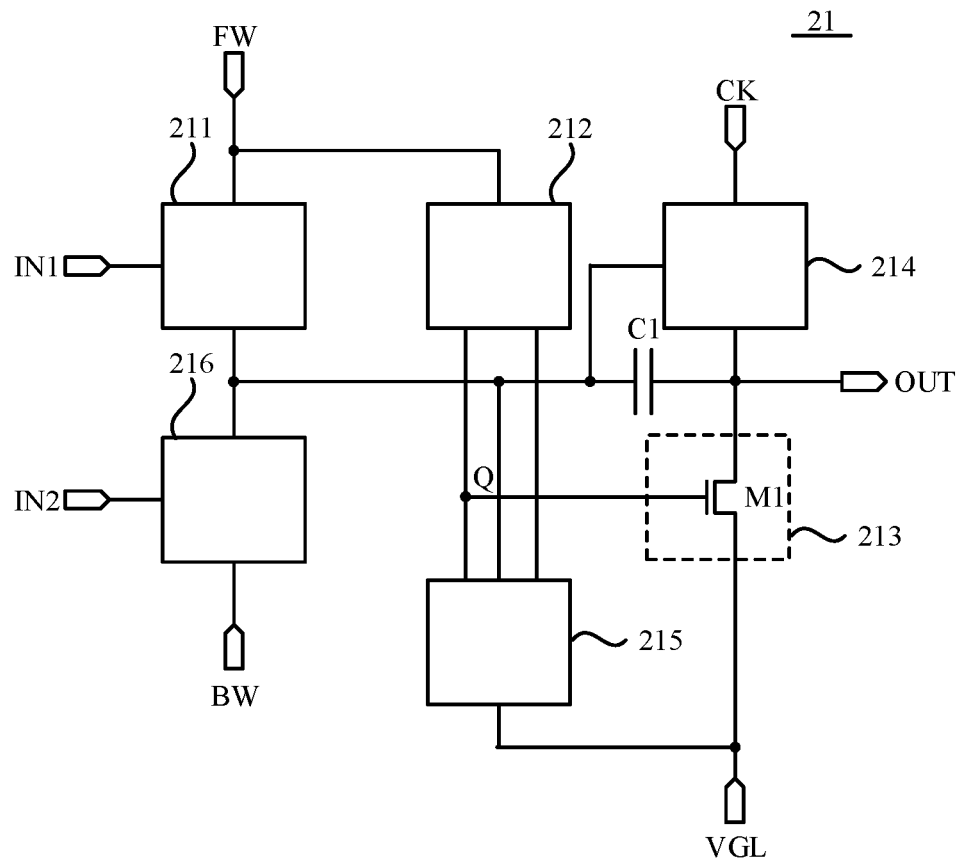
FIG. 4 is a structural diagram of another shift register unit provided by an embodiment of the present disclosure.

Exemplarily, FIG. 4 is a structural diagram of another shift register unit provided by an embodiment of the present disclosure. For the same parts in FIG. 4 and FIG. 2, reference may be made to the preceding description of FIG. 2, which is not repeated herein. Only the differences between FIG. 4 and FIG. 2 are exemplified. As shown in FIG. 4, the gate of the first transistor M1 is electrically connected to the first node Q, the first pole of the first transistor M1 is electrically connected to the first level signal terminal VGL, and the second pole of the first transistor M1 is electrically connected to the signal output terminal OUT. In this case, in the non-scanning phase of the frame, the scanning control signal Fw of the scanning control terminal FW is configured to include a disable level controlling the first transistor M1 to be turned off, so that when the pull-down control module 212 transmits the disable level of the scanning control terminal FW to the first node Q, the first transistor M1 can be in an off state and a corresponding current path from the signal output terminal OUT to the first level signal terminal VGL through the first transistor M1 cannot be formed. In this manner, the charges stored at the signal output terminal OUT and/or the second node P cannot be discharged, and the loss amount of the charges stored at the signal output terminal OUT and/or the second node P is reduced, ensuring that in the non-scanning phase, the scanning signal output from the signal output terminal of each shift register unit 21 can be maintained at the disable level for a long time, preventing a case where the display panel 100 displays abnormally caused by the abnormality of the scanning signals transmitted by the scanning signal lines 10 in the display area 101 due to the signal output abnormality of the shift register units 20, and thereby further improving the display quality of the display panel 100.

For ease of description, the embodiments of the present disclosure are exemplarily described by using an example of the connection manner of the first transistor shown in FIG. 2.

It is to be understood that the higher a refresh frequency of the display panel, the shorter a time for the display panel to display one frame, correspondingly, the higher a scanning frequency of the display panel, and the shorter the frame; while the lower the refresh frequency of the display panel, the longer the time for the display panel to display one frame, the lower the scanning frequency of the display panel, and the longer the frame. Although a higher refresh frequency enables the display panel to have a higher dynamic display quality, the higher refresh frequency also allows the display panel to have a higher power consumption. Therefore, when the display panel does not require a higher refresh frequency, the display panel may be switched from a higher refresh frequency to a lower refresh frequency. Correspondingly, the display panel may include two working modes, i.e., a first working mode and a second working mode; and a scanning frequency in the first working mode is greater than a scanning frequency in the second working mode.

In an embodiment, in a case where the working mode of the display panel is the first working mode, both in the scanning phase and in the non-scanning phase of the frame, the scanning control signal is at the enable level controlling the first transistor to be turned on; in a case where the working mode of the display panel is the second working mode, in the scanning phase of the frame, the scanning control signal is at the enable level controlling the first transistor to be turned on, and in the non-scanning phase of the frame, the scanning control signal includes the disable level controlling the first transistor to be turned off.

Figure 5:
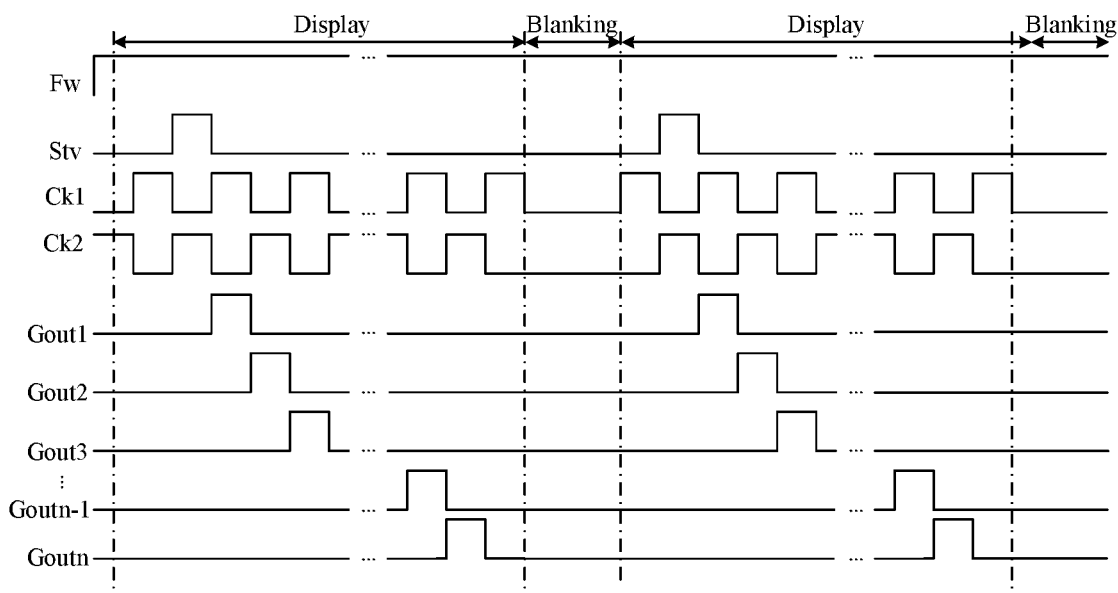
FIG. 5 is a driving timing diagram of another shift register circuit provided by an embodiment of the present disclosure.

In an embodiment, FIG. 5 is a driving timing diagram of another shift register circuit provided by an embodiment of the present disclosure. As shown in FIG. 5, since when the display panel displays in the first working mode, the scanning frequency is relatively large, the frame is relatively short, the non-scanning phase Blanking of each frame is relatively short, and a discharging time of the first transistor at the second node and/or the signal output terminal is relatively short, so that the potential change at the second node and/or the signal output terminal is relatively small and does not have a relatively large effect on the scanning signal Gout, that is, the normal display of the display panel is not affected. At the same time, since the scanning control signal Fw is normally transmitted by a corresponding signal transmission line, when the scanning control signal Fw is switched, it is necessary to recharge the signal transmission line and the scanning control terminal to reach a switch potential, which may cause the unnecessary power consumption. Therefore, on the premise that the display panel can be normally displayed, when the display panel displays in the first working mode, both in the scanning phase Display and in the non-scanning phase Blanking of the frame, the scanning control signal Fw may be maintained at the enable level controlling the first transistor to be turned on to reduce the power consumption of the display panel.

Correspondingly, as shown in FIG. 3, since when the display panel displays in the second working mode, the scanning frequency is relatively low, the frame is relatively long, the non-scanning phase Blanking of each frame is relatively long, and a discharging time of the first transistor at the second node and/or the signal output terminal is relatively long, the potential change at the second node and/or the signal output terminal is relatively large, resulting in that the potential change has a relatively large effect on the scanning signal Gout. Therefore, when the display panel displays in the second working mode, the disable level of the scanning control signal Fw is provided for the scanning control terminal in the non-scanning phase Blanking to control the first transistor to be in the off state so as to prevent the scanning signal Gout output by the signal output terminal from being affected by the long discharging of the first transistor at the second node and/or the signal output terminal, thereby further improving the display effect of the display panel.

Further, as the temperature, humidity and the like increases, the characteristic drift occurs in the transistor in each shift register unit, making the display abnormality caused by the discharging of the first transistor at the second node and/or the signal output terminal more obvious. Therefore, in the non-scanning phase in the high-temperature and high-humidity environment, the scanning control signal of the scanning control terminal may be provided to be at the disable level controlling the first transistor to be turned off. Table 1 is a verification table of output information on the shift register units in different temperatures and frequencies provided by the embodiments of the present disclosure.

If the scanning control signal in the non-scanning phase includes the disable level, in a case where the refresh frequency is relatively low and the environment temperature is relatively high, as in a case of No. 6 in Table 1, within a two-day test, it is maintained that no shift register units abnormally output; in the case where the refresh frequency is kept low, the environment temperature continues to rise and the test time is prolonged, as in a case of No. 4 in Table 1, after a ten-day test, it is still maintained that no shift register unit abnormally output.

It can be seen that, when the temperature is high and the refresh frequency is relatively low, the output abnormality of the shift register units caused by the discharging of the first transistors becomes more obvious. In this case, the scanning control signal is configured to include the disable level controlling the first transistor to be turned off, effectively alleviating the output abnormality of the shift register units, and thus improving the display effect of the display panel.

Exemplarily, in the first working mode, the refresh frequency (scanning frequency) of the display panel is 120 Hz, and in the second working mode, the refresh frequency (scanning frequency) of the display panel may be 60 Hz; or in the first working mode, the refresh frequency (scanning frequency) of the display panel is 240 Hz, and in the second working mode, the refresh frequency (scanning frequency) of the display panel may be 120 Hz or 60 Hz; or in the first working mode, the refresh frequency (scanning frequency)

| Sequence Number | Scanning control signal in the non-scanning phase | Test condition (environment temperature and refresh frequency) | Test time (days) | Validation result |
|---|---|---|---|---|
| 1 | maintain at enable level | −20° C., 240 Hz | 10 | no shift register unit abnormally outputs |
| 2 | maintain at enable level | 60° C., 240 Hz | 10 | no shift register unit abnormally outputs |
| 3 | maintain at enable level | 85° C., 240 Hz | 10 | 1/16 of shift register units abnormally outputs |
| 4 | include disable level | 85° C., 60 Hz | 10 | no shift register unit abnormally outputs |
| 5 | maintain at enable level | 70° C., 60 Hz | 2 | 12/16 shift register units abnormally output |
| 6 | include disable level | 70° C., 60 Hz | 2 | no shift register unit abnormally outputs |

As can be seen from Table 1, if the scanning control signal in the non-scanning phase is maintained at the enable level, in a case where the environment temperature is relatively low and the refresh frequency is relatively high, as in a case of No. 1 in Table 1, after a long time (ten day) of test, it is found that no shift register unit abnormally outputs; or in a case where the environment temperature rises to a relatively high value with other conditions unchanged, as in a case of No. 2 in Table 1, after a ten-day test, it can be maintained that no shift register unit abnormally outputs; in a case where the refresh frequency is kept relatively high and the test temperature continue to rise, as in a case of No. 3 in Table 1, after a ten-day test, 1/16 of shift register unit abnormally outputs; and in a case where the environment temperature is kept relatively high and the refresh frequency is reduced, as in a case of No. 5 in Table 1, within a two-day test, more than half of the shift register units abnormally output. It can be seen that, if the scanning control signal in the non-scanning phase is maintained at the enable level, rising of the environment temperature may cause a part of the shift register units to abnormally output even if the refresh frequency is relatively high, and more shift register units abnormally output in the case where the refresh frequency is relatively low and the environment temperature is relatively high.

of the display panel is 90 Hz, and in the second working mode, the refresh frequency (scanning frequency) of the display panel may be 45 Hz. That is, the refresh frequency of the display panel in the first working mode may be twice the refresh frequency of the display panel in the second working mode. The refresh frequency of the display panel is not specifically limited in the embodiments of the present disclosure.

It is to be understood that FIGS. 3 and 5 are only diagrams exemplarily illustrating the embodiments of the present disclosure, and FIGS. 3 and 5 only exemplarily illustrate that the enable level of each signal is a high level and the disable level of each signal is a low level. It is to be understood that in the embodiments of the present disclosure, if a corresponding thin-film transistor in a sub-pixel is a P-type transistor, the enable level of the scanning signal is a low level and the disable level of the scanning signal is a high level. Similarly, when the first transistor is a P-type transistor, the enable level of the scanning control signal is a low level, and the disable level of the scanning control signal is a high level.

Figure 6:
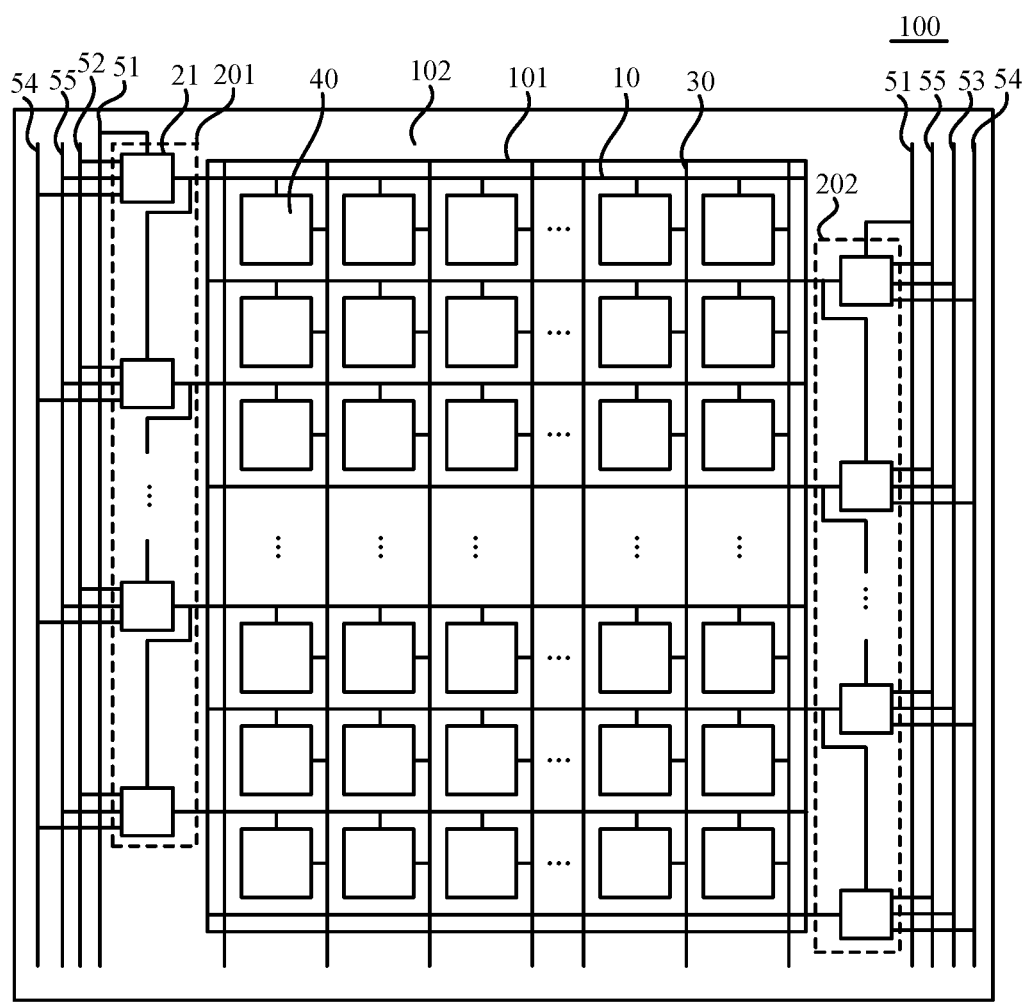
FIG. 6 is a structural diagram of another display panel provided by an embodiment of the present disclosure.

It is to be noted that FIG. 1 is only a diagram exemplarily illustrating the embodiments of the present disclosure, and only exemplarily illustrates that the display panel 100 includes only one shift register circuit 20, and the one shift register circuit 20 is located on one side of the display area 101. In this embodiment of the present disclosure, the display panel may also include two shift register circuits. As shown in FIG. 6, the two shift register circuits 201 and 202 of the display panel 100 may be respectively located on two opposite sides of the display area 101, and the signal output terminal of each shift register unit 21 of the shift register circuit 201 may be electrically connected to a scanning signal line 10 corresponding to an odd row of sub-pixels 40, and the signal output terminal of each shift register unit 21 of the shift register circuit 202 may be electrically connected to a scanning signal line 10 corresponding to an even row of sub-pixels 40. For ease of description, technical solutions in the embodiments of the present disclosure are exemplarily described by using an example of the display panel shown in FIG. 1 in the embodiments of the present disclosure, unless otherwise specified.

Figure 7:
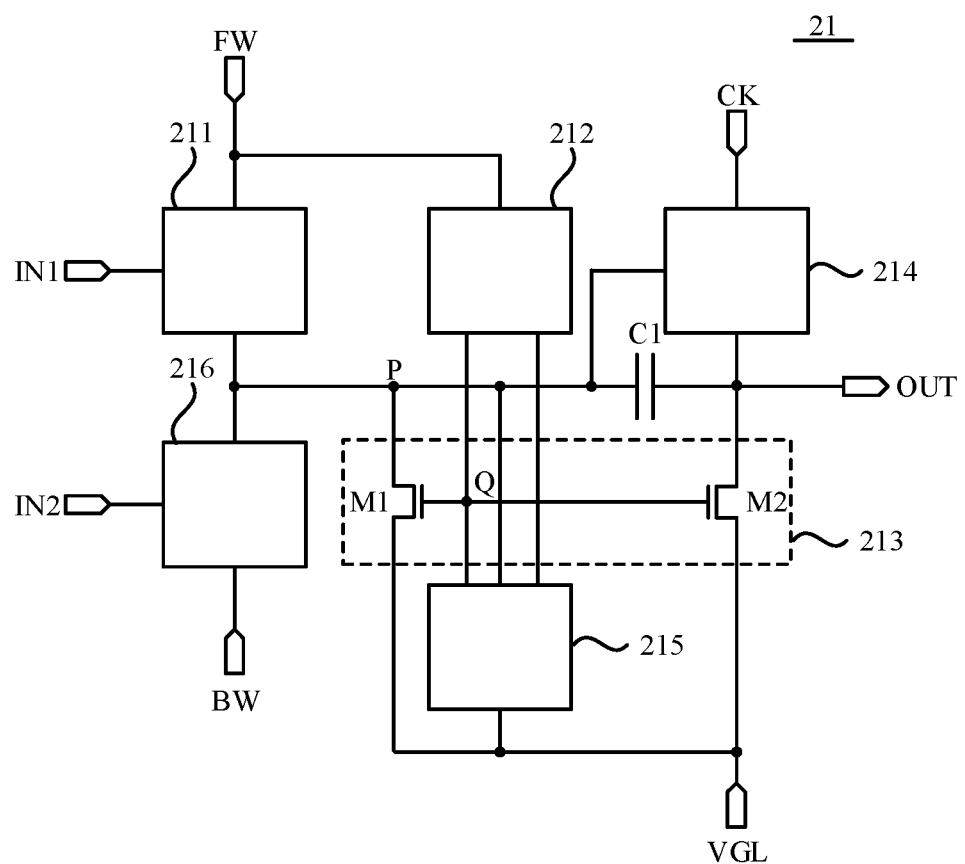
FIG. 7 is a structural diagram of another shift register unit provided by an embodiment of the present disclosure.

FIG. 7 is a structural diagram of another shift register unit provided by an embodiment of the present disclosure. The pull-down module 213 of the shift register unit 21 may further include a second transistor M2 in addition to a first transistor M1. A gate of the second transistor M2 is also electrically connected to the first node Q. In this case, in the same shift register unit 21, both a first pole of the first transistor M1 and a first pole of the second transistor M2 are electrically connected to the first level signal terminal VGL; a second pole of the first transistor M1 is electrically connected to the second node P, and a second pole of the second transistor M2 is electrically connected to the signal output terminal OUT. Moreover, a channel type of the first transistor M1 is the same as a channel type of the second transistor M2, that is, a signal capable of controlling the first transistor M1 to be turned on is also capable of controlling the second transistor M2 to be turned on, and a signal capable of controlling the first transistor M1 to be turned off is also capable of controlling the second transistor M2 to be turned off.

In this way, in a scanning phase of the frame, when the pull-down control module 212 transmits a scanning control signal Fw at the enable level to the first node Q, both the first transistor M1 and the second transistor M2 can be turned on as needed; and in a non-scanning phase of the frame, when the pull-down control module 212 transmits a scanning control signal Fw at the disable level to the first node Q, both the first transistor M1 and the second transistor M2 can be in an off state, and thus a current path from the first node P to the first level signal terminal VGL through the first transistor M1 cannot be formed, and a current path from the signal output terminal OUT to the first level signal terminal VGL through the second transistor M2 cannot be formed, so that the loss amount of charges at each of the first node P and the signal output terminal OUT can be reduced, ensuring that in the non-scanning phase, the scanning signal Gout output from the signal output terminal OUT of the shift register unit 21 can be maintained at the disable level for a long time, avoiding the signal output abnormality of the shift register circuit, and improving the display quality of the display panel.

In an embodiment, referring to FIGS. 1 and 7, the display panel 100 may further include a start-up signal line 51. The start-up signal line 51 is located in the non-display area 102. Correspondingly, each shift register unit 21 further includes an input module 211, an output module 214, a storage capacitor C1, a signal input terminal IN1, and a clock signal terminal CK. In the same shift register unit 21, the input module 211 is electrically connected to the scanning control terminal FW, the signal input terminal IN1 and the second node P separately; the input module 211 is configured to transmit the scanning control signal Fw of the scanning control terminal FW to the second node P under the control of an input signal of the signal input terminal IN1; the storage capacitor C1 is electrically connected between the second node P and the signal output terminal OUT; the storage capacitor C1 is capable of storing potentials of the second node P and the signal output terminal OUT; the output module 214 is electrically connected to the second node P, the clock signal terminal CK and the signal output terminal OUT separately; the output module 214 is configured to transmit a clock signal Ck of the clock signal terminal CK to the signal output terminal OUT under the control of the potential of the second node P. A signal input terminal IN1 of a first cascade shift register unit is electrically connected to the start-up signal line 51, and a signal input terminal IN1 of each shift register unit 21 of a second cascade shift register unit to a last cascade shift register unit is electrically connected to a signal output terminal OUT of a previous cascade shift register unit of the each shift register unit 21.

Specifically, referring to FIGS. 1, 7 and 3, at the start of the scanning phase of each frame, the start-up signal line 51 transmits a start-up signal at an enable level to a first cascade shift register unit so that the input module of the first cascade shift register unit transmits, under the control of the start-up signal, the scanning control signal Fw of the scanning control terminal FW to the second node P to charge the second node P and the storage capacitor C1; and when the second node P is charged to be at the enable level, the output module 214 transmits, under the control of the second node P, the clock signal Ck of the clock signal terminal CK to the signal output terminal OUT, and outputs, through the signal output terminal OUT, the clock signal Ck (Ck1) to the corresponding scanning signal line 10 and the signal input terminal IN1 of the second cascade shift register unit to control the second cascade shift register unit to enter a stage of charging the second node P and the storage capacitor C1 of the second cascade shift register unit. When the second cascade shift register unit completes the charging of the second node P and the storage capacitor C1, in the second cascade shift register unit, the output module 214 transmits the clock signal Ck (Ck2) of the clock signal terminal CK to the signal output terminal OUT, and then transmits, through the signal output terminal OUT, the clock signal Ck to the corresponding scanning signal line 10 and the signal input terminal IN1 of the third cascade shift register unit separately. Meanwhile, the pull-down control module 212 of the first cascade shift register unit transmits the scanning control signal Fw at the enable level of the scanning control terminal FW to the first node Q to control the first transistor M1 and the second transistor M2 in the pull-down module 213 of the first cascade shift register unit to be turned on, so that a first level signal Vg1 of the first level signal terminal VGL is transmitted to the second node P and the signal output terminal OUT separately, and then transmitted to the corresponding scanning signal line 10 through the signal output terminal OUT while being input to the signal input terminal IN1 of the second cascade shift register unit. In this way, the signal outputted from the signal output terminal of the current cascade shift register unit controls the signal inputted by the signal input terminal of the next cascade shift register unit, so that each shift register unit sequentially outputs the scanning signal at the enable level.

After the signal output terminal OUT of the last cascade shift register unit outputs the clock signal of the clock signal terminal CK of the last cascade shift register unit, the process goes to the non-scanning phase. In the non-scanning phase, the signal input terminal IN1 of each shift register unit 21 no longer receives an input signal at the enable level so that the second node P and the signal output terminal OUT of each shift register unit 21 are maintained to be the first level signal Vg1. Meanwhile, when the scanning control signal Fw of the scanning control terminal FW of each shift register unit 21 is at the disable level, the first transistor M1 and the second transistor M2 are in the off state, avoiding charges in the storage capacitor C1 from being reduced due to discharging of the charges stored in the storage capacitor C1 when the first transistor M1 and the second transistor M2 are on, and then affecting potentials of the first node P and the signal output terminal OUT. In this way, in the non-scanning phase, the second node P and the signal output terminal OUT of each shift register unit 21 can be continuously maintained to be the first level signal Vg1, ensuring the signal output terminal OUT of each shift register unit 21 to output the normal scanning signal, thereby improving the display quality of the display panel 100.

In addition, when each shift register unit 21 includes the first level signal terminal VGL, the scanning control terminal BW, and the clock signal terminal CK, the non-display area 102 of the display panel 100 needs to be provided with a low-level transmission line 54 for transmitting the first level signal Vg1, a signal transmission line 55 for transmitting the scanning control signal Fw, and clock signal lines 52 and 53 for transmitting the clock signal Ck (Ck1 and Ck2). A clock signal terminal CK of a shift register unit 21 connected to a scanning signal line 10 corresponding to an odd row of sub-pixels 40 is electrically connected to the clock signal line 52 to receive a clock signal Ck1 transmitted by the clock signal line 52, and a clock signal terminal CK of a shift register unit 21 connected to a scanning signal line 10 corresponding to an even row of sub-pixels 40 is electrically connected to the clock signal line 53 to receive a clock signal Ck2 transmitted by the clock signal line 53. Polarities of the clock signal Ck1 and the clock signal Ck2 are opposite at the same time.

It is to be understood that, referring to FIGS. 1, 7 and 3, in the embodiments of the present disclosure, the shift register circuit 20 may be a shift register circuit only capable of performing unidirectional scanning, that is, in the scanning phase of the frame, the shift register units 21 can only sequentially output from top to bottom, or sequentially output the scanning signals at the enable level from bottom to top. Alternatively, the shift register circuit 20 may be a shift register circuit capable of performing bidirectional scanning, that is, in the scanning phase of the frame, the shift register units 21 can sequentially output the scanning signals at the enable level from top to bottom and can also sequentially output the scanning signals at the enable level from bottom to top. Generally, a process of sequentially outputting the scanning signals at the enable level by the shift register units 21 from top to bottom is referred to as a forward scanning process, and a process of sequentially outputting the scanning signals at the enable level by the shift register units 21 from bottom to top is referred to as a reverse scanning process. In this case, each shift register unit 21 further includes a reset input terminal IN2. The reset input terminal IN2 is electrically connected to the signal output terminal OUT of the next cascade shift register unit. Similarly, each shift register unit 21 may further include a reset module 216 and a reset control terminal BW. In the forward scanning process, the scanning control signal Fw of the scanning control terminal FW is at the enable level and the reset control signal Bw of the reset control terminal BW is at the disable level. In the reverse scanning process, the scanning control signal Fw of the scanning control terminal FW is at the disable level, and the reset control signal Bw of the reset control terminal BW is at the enable level. For ease of description, technical solutions in embodiments of the present disclosure are exemplarily described by using an example of the forward scanning process in the embodiments of the present disclosure.

Referring to FIG. 7, each shift register unit 21 may further include a pull-up module 215. In the same shift register unit 21, the pull-up module 215 is electrically connected to the pull-down control module 212, the first node Q, the second node P, and the first level signal terminal VGL separately. The pull-up module 215 is configured to transmit, under the control of the potential of the second node P, the first level signal Vg1 to the first node Q and the pull-down control module 212 separately. In this way, when the second node P is at the enable level capable of controlling the output module 214 to transmit the clock signal Ck (Ck1 or Ck2) of the clock signal terminal CK to the signal output terminal, the pull-up module 215 can transmit the first level signal Vg1 to the first node Q and the pull-down control module 212 separately to prevent the pull-down control module 212 from transmitting the scanning control signal Fw of the scanning control terminal FW to the first node Q, that is, both the first transistor M1 and the second transistor M2 is enabled to be in the off state so as to avoid affecting the potentials of the second node P and the signal output terminal OUT caused by the first transistor M1 and the second transistor M2 being on.

Figure 8:
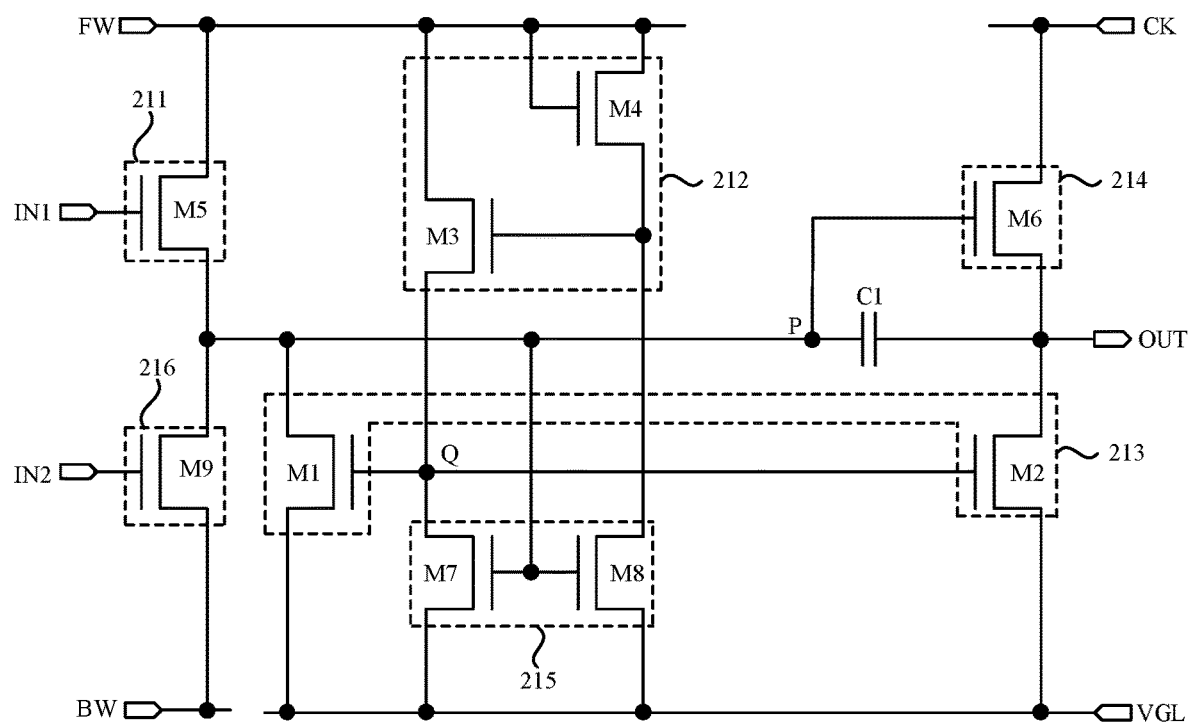
FIG. 8 is a structural diagram of a specific circuit of a shift register unit provided by an embodiment of the present disclosure.

FIG. 8 is a structural diagram of a specific circuit of a shift register unit provided by an embodiment of the present disclosure. As shown in FIG. 8, the pull-down control module 212 may include a third transistor M3 and a fourth transistor M4. In the same shift register unit 21, a first pole of the third transistor M3, a gate of the fourth transistor M4, and a first pole of the fourth transistor M4 are electrically connected to a scanning control terminal FW. A second pole of the third transistor M3 is electrically connected to a first node Q, and a gate of the third transistor M3 is electrically connected to a second pole of the fourth transistor M4 and a pull-up module 215 separately. In this case, the third transistor M3 and the fourth transistor M4 can be turned on or off under a cooperative control of the scanning control signal Fw of the scanning control terminal FW and the pull-up module 215, and when the third transistor M3 and the fourth transistor M4 are turned on, the scanning control signal Fw of the scanning control terminal FW can be transmitted to the first node Q, and when the third transistor M3 and the fourth transistor M4 are turned off, the scanning control signal Fw of the scanning control terminal FW can be prevented from being transmitted to the first node Q. Correspondingly, the first transistor M1 and the second transistor M2 can be turned on or off under a cooperative control of the pull-up module 215 and the pull-down control module 212.

It is to be noted that the structure of each module in each shift register unit 21 provided by the embodiments of the present disclosure can be designed as needed. Technical solutions in the embodiments of the present disclosure are described hereinafter in conjunction with a typical example of the shift register unit.

Exemplarily, referring to FIG. 8, in the shift register unit 21, the input module 211 may include a fifth transistor M5, the output module 214 may include a sixth transistor M6, the pull-up module 215 may include a seventh transistor M7 and an eighth transistor M8, and the reset module 216 may include a ninth transistor M9.

Figure 9:
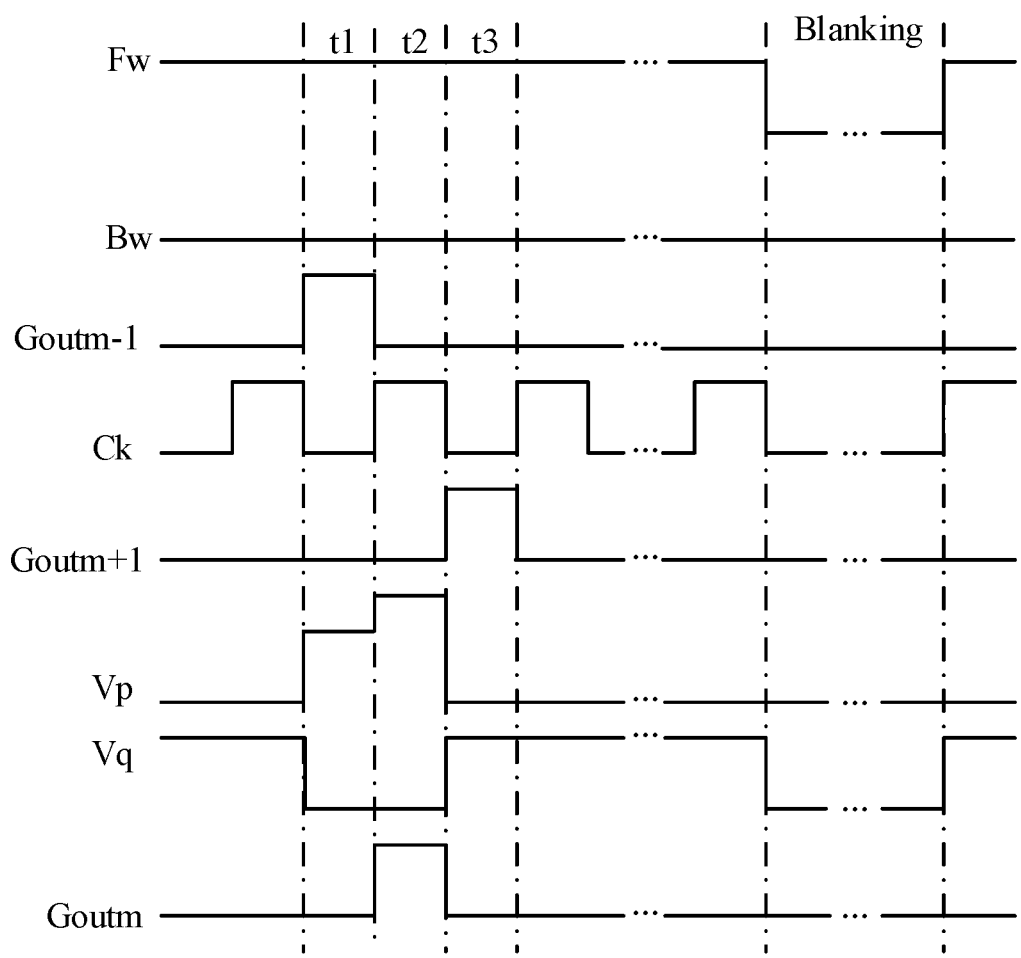
FIG. 9 is a driving timing diagram of the pixel circuit in FIG. 8.

By using an example in which each transistor is an N-type transistor in FIG. 8, FIG. 9 is a driving timing diagram of the pixel circuit corresponding to FIG. 8, and referring to FIGS. 8 and 9, in a scanning phase of one frame, a working process of the shift register unit is described below.

In phase t1, a scanning signal Goutm−1 received by a signal input terminal IN1 from the signal output terminal OUT of the previous cascade shift register unit is at a high level and a clock signal Ck of the clock signal terminal CK is at a low level, so that the fifth transistor M5 is turned on, a scanning control signal Fw at a high level of the scanning control terminal FW is transmitted to the second node P so that the second node P is at a high level, the seventh transistor M7 and the eighth transistor M8 are turned on, a first level signal of the first level signal terminal VGL is transmitted to the first node Q through the seventh transistor M7 and transmitted to a gate of the third transistor M3 through the eighth transistor M8; the third transistor M3, the first transistor M1 and the second transistor M2 are turned off, the sixth transistor M6 is turned on, and the clock signal Ck of the clock signal terminal CK is transmitted to the signal output terminal OUT so that the signal output terminal OUT output a low-level scanning signal Goutm.

In phase t2, the scanning signal Goutm−1 received by the signal input terminal IN1 from the signal output terminal OUT of the previous cascade shift register unit is at a low level and the clock signal Ck of the clock signal terminal CK is at a high level, the second node P is maintained at a high level of phase t1 since no low-level signal is input, the sixth transistor M6, the seventh transistor M7 and the eighth transistor M8 are kept in an on state, under the control of the seventh transistor M7, the first level signal Vg1 is input to the first node Q, and the first node Q is at the low level. Since the clock signal Ck is at the high level, the high-level clock signal Ck is transmitted to the signal output terminal OUT through the sixth transistor M6 so that the signal output terminal OUT outputs a high-level scanning signal Goutm, and due to a bootstrap effect of the storage capacitor C1, the potential of the second node P is further raised.

In phase t3, a scanning Goutm+1 received by the reset input terminal IN2 from the signal output terminal OUT of the next cascade shift register unit is at a high level and the clock signal Ck is at a low level, the ninth transistor M9 is turned on, a reset control signal Bw at a low level of the reset control terminal BW is written to the second node P so that the second node P becomes a low level, the sixth transistor M6, the seventh transistor M7 and the eighth transistor M8 are turned off, and the third transistor M3 is turned on under the control of the high-level scanning control signal Fw transmitted by the fourth transistor M4 so that the high-level scanning control signal Fw is transmitted to the first node Q through the third transistor M3, thereby controlling the first transistor M1 and the second transistor M2 to be turned on so that the first level signal Vg1 is transmitted to the second node P and the signal output terminal OUT, and the signal output terminal OUT stably outputs a low-level scanning signal Goutm.

After phase t3, since the scanning control signal Fw is always at the high level and the second node P and the signal output terminal OUT have been discharged through the ninth transistor M9 in phase t2 (in this case, the seventh transistor M7 is in the off state), the first node Q is not discharged so that the signal output terminal OUT can stably output the low-level scanning signal Goutm, until the non-scanning phase of the frame is entered.

After the non-scanning phase Blanking is entered, the scanning control signal Fw becomes a low level, the reset control terminal BW is maintained at the low level, the clock signal Ck is continuously maintained at the low level, the first transistor M1 and the second transistor M2 are switched to the off state from the on state, the scanning signal Goutm−1 output from the signal output terminal OUT of the previous cascade shift register unit is maintained at the low level, the scanning signal Goutm+1 output from the signal output terminal OUT of the next cascade shift register unit is also maintained at the low level, and both the fifth transistor M5 and the ninth transistor M9 are maintained at the off state. The low-level scanning control signal Fw cannot control the third transistor M3 and the fourth transistor M4 to be turned on, and thus cannot be transmitted to the first node Q. In addition, since the first node Q is not provided with a corresponding storage capacitor, the first node Q will go into a low-level state when the first node Q cannot receive a high-level scanning control signal Fw. The low-level signal of the first node Q controls both the first transistor M1 and the second transistor M2 to be in the off state, so that a current path from the second node P to the first level signal terminal VGL cannot be formed, and a current path from the signal output terminal OUT to the first level signal terminal VGL also cannot be formed. In this manner, the second node P and the signal output terminal OUT are not discharged so that the second node P and the signal output terminal OUT are kept in the low-level state, thereby ensuring that the output terminal OUT stably outputs the low-level scanning signal Goutm, until the next frame is entered.

It is to be noted that FIG. 8 is only a diagram exemplarily illustrating the embodiments of the present disclosure. On the premise that the core inventive concept of the embodiments of the present disclosure can be implemented, the specific structure of the shift register unit is not limited in the embodiments of the present disclosure.

Figure 10:
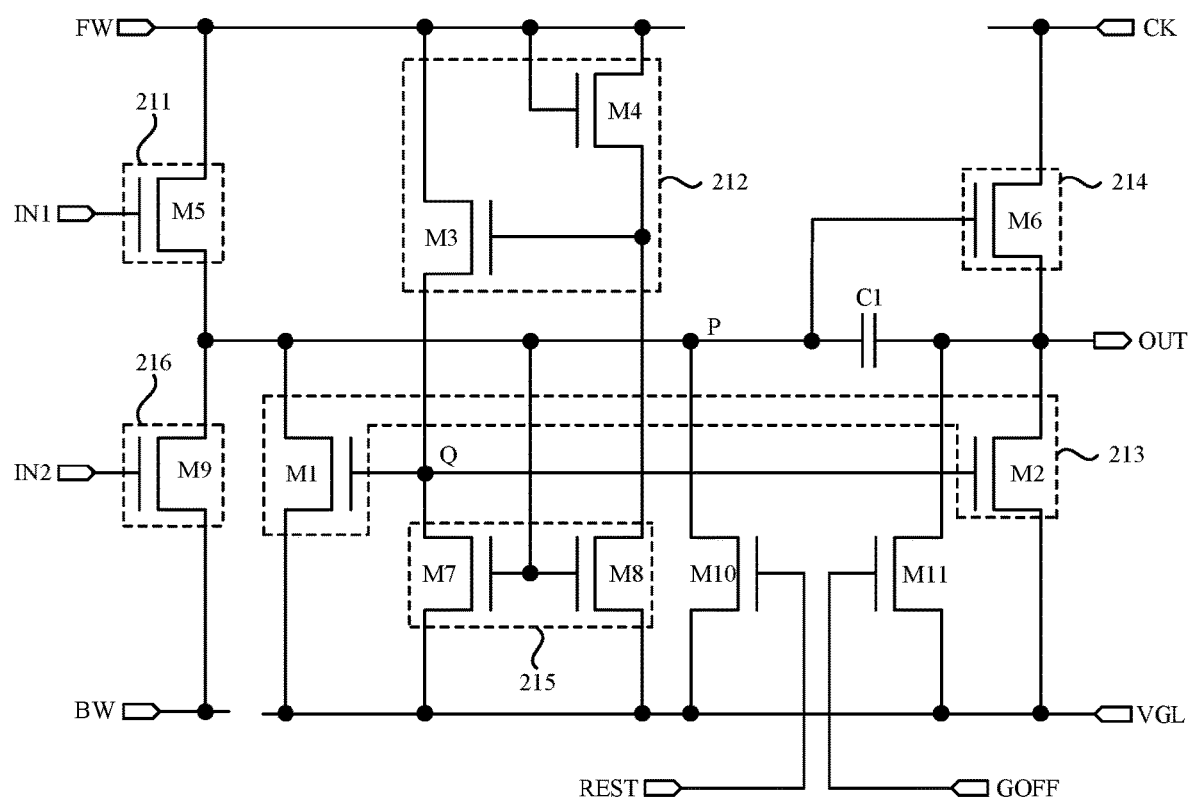
FIG. 10 is a structural diagram of a specific circuit of another shift register unit provided by an embodiment of the present disclosure.

Exemplarily, FIG. 10 is a structural diagram of a specific circuit of another shift register unit provided by an embodiment of the present disclosure. As shown in FIG. 10, each shift register unit may further include a tenth transistor M10, an eleventh transistor M11, a reset signal terminal REST, and a turn-off signal terminal GOFF. A gate of the tenth transistor M10 is electrically connected to the reset signal terminal REST, a first pole of the tenth transistor M10 is electrically connected to the first level signal terminal VGL, and a second pole of the tenth transistor M10 is electrically connected to the second node P. A gate of the eleventh transistor M11 is electrically connected to the turn-off signal terminal GOFF, a first pole of the eleventh transistor M11 is electrically connected to the first level signal terminal VGL, and a second pole of the eleventh transistor M11 is electrically connected to the signal output terminal OUT. In this way, the reset signal terminal REST and the turn-off signal terminal GOFF may be at the high level in the non-scanning phase, so that the tenth transistor M10 and the eleventh transistor M11 are turned on, and the second node P and the signal output terminal OUT are controlled to maintain at the low level to avoid the signal output from the signal output terminal OUT from being affected by the interference of other signals (such as a touch signal), thereby further improving the display effect of the display panel.

Figure 11:
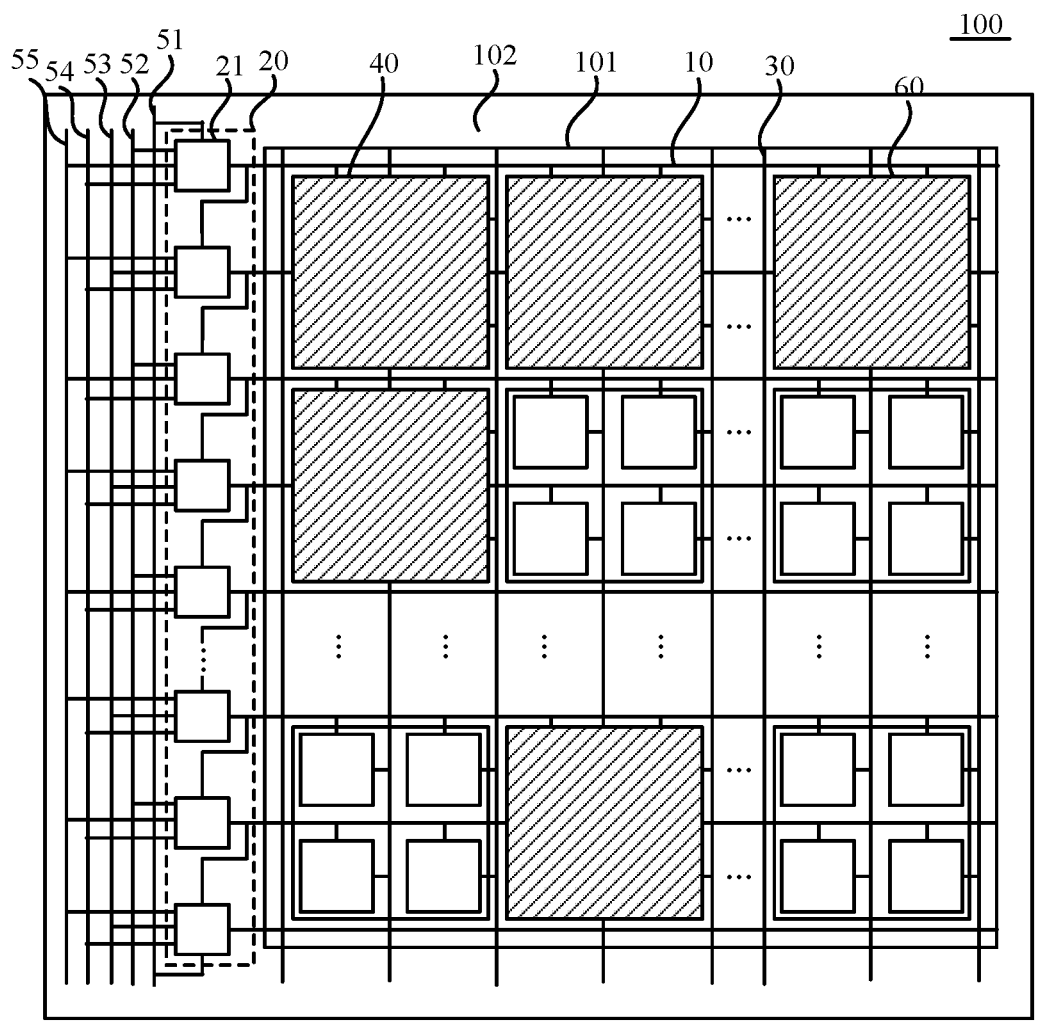
FIG. 11 is a structural diagram of another display panel provided by an embodiment of the present disclosure.

FIG. 11 is a structural diagram of another display panel provided by an embodiment of the present disclosure. As shown in FIG. 11, the display panel 100 may further include multiple touch electrode 60. In this case, the non-scanning phase further includes a touch phase. In the touch phase, each touch electrodes receive and/or transmits a touch signal, and the scanning control signal is at a continuous enable level or a continuous disable level.

The touch electrode may be a block-shaped touch electrode as shown in FIG. 11, or may be a strip-shaped or a planar-shaped touch electrode. Correspondingly, the touch electrode 60 may be a self-capacitive touch electrode or a mutual-capacitive touch electrode. In a case where the touch electrode 60 is the self-capacitive touch electrode 60, each touch electrode 60 serves as both a touch driving electrode and a touch sensing electrode, and in the touch phase, each touch electrode 60 receives a corresponding touch signal (i.e., a touch driving signal) and transmits a corresponding touch signal (i.e., a touch detection signal) to determine a touch position according to the received touch driving signal and the transmitted touch detection signal; and in a case where the touch electrode 60 is the mutual-capacitive touch electrode, the mutual-capacitive touch electrode may include a touch sensing electrode and a touch driving electrode, or the mutual-capacitive touch electrode may just be a touch sensing electrode, or may just be a touch driving electrode. In a case where the mutual-capacitive touch electrode 60 includes the touch sensing electrode and the touch driving electrode, the touch-sensing electrode and the touch-driving electrode may be disposed in a same layer or in different layers, and the corresponding touch signal (the touch driving signal) is provided for the touch driving electrode and the touch signal (the touch detection signal) transmitted by the touch sensing electrode is received to determine the touch position; in the case where the mutual-capacitive touch electrode 60 is the touch driving electrode, the touch sensing electrode may be disposed in another included module structure (such as a cover plate), in this case, the touch electrode 60 just receives the touch signal (the touch driving signal); and in a case where the mutual-capacitive touch electrode 60 is the touch sensing electrode, the touch driving electrode may be provided in another included module structure (such as a cover plate), and in this case, the touch electrode 60 just transmits the touch signal (the touch detection signal).

In the touch phase, it is necessary to provide a touch signal to the touch driving electrode, and the touch signal is usually a pulse signal having a relatively small amplitude. A touch signal transmitted by the touch sensing electrode is also a pulse signal having a relatively small amplitude. When there is a significant difference between the touch signal transmitted by the touch sensing electrode and the touch signal received by the touch driving electrode, a position where the touch driving electrode and the touch sensing electrode are located is considered to be the touch position of a touch object. Since the signals in the display panel are interrelated, if other signals in the display panel have a relatively large fluctuation in the touch phase, the touch signal received and/or transmitted by the touch electrode would be affected, causing the misjudgment of the touch position.

Figure 12:
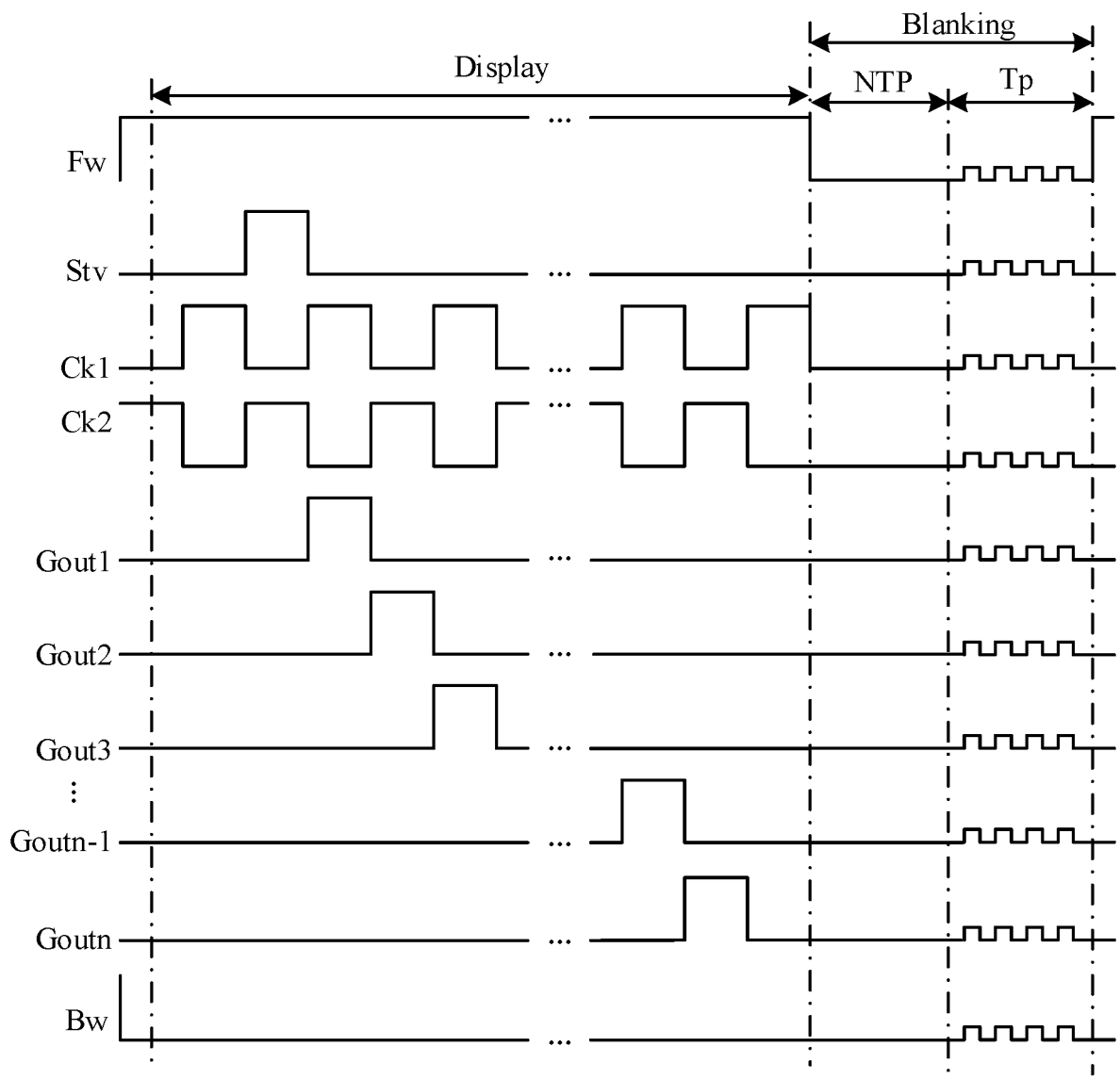
FIG. 12 is a driving timing diagram of another shift register circuit provided by an embodiment of the present disclosure.

Exemplarily, FIG. 12 is a driving timing diagram of another shift register circuit provided by an embodiment of the present disclosure. Referring to FIGS. 10, 11 and 12, the non-scanning phase Blanking includes a touch phase Tp and a non-touch phase NTP. In each of the touch phase TP and the non-touch phase NTP, a scanning control signal Fw of the scanning control terminal FW may be maintained at a continuous disable level, that is, the scanning control signal Fw is a continuous low level signal capable of controlling the N-type first transistor to be maintained in an off state, so that the scanning control signal Fw does not change suddenly in the touch phase TP and the non-touch phase NTP, avoiding the touch accuracy from being affected by the fluctuation of the scanning control signal Fw.

In the non-scanning phase, the scanning control signal may further include, in addition to the disable level controlling the first transistor to be turned off, an enable level controlling the first transistor to be turned on. In this way, in a case where the scanning control signal is at the disable level, the first transistor is in the off state, and in a case where the scanning control signal is at the enable level, the first transistor is in an on state, so that the discharge amount of the first transistor to the second node and/or the signal output terminal can be reduced, compared with the case where the first transistor is in the on state in the entire non-scanning phase. In this case, the stability of the scanning signal output from the signal output terminal of each shift register unit can be ensured, thereby improving the display effect of the display panel. Meanwhile, when the scanning control signal includes both the enable level and the disable level in the non-scanning phase, the first transistor can be switched between the on state and the off state, avoiding the following problem: when the first transistor is in a certain state for a long period of time, threshold drifting would occur in the first transistor, which affects the signal output of the shift register unit in the next frame.

Figure 13:
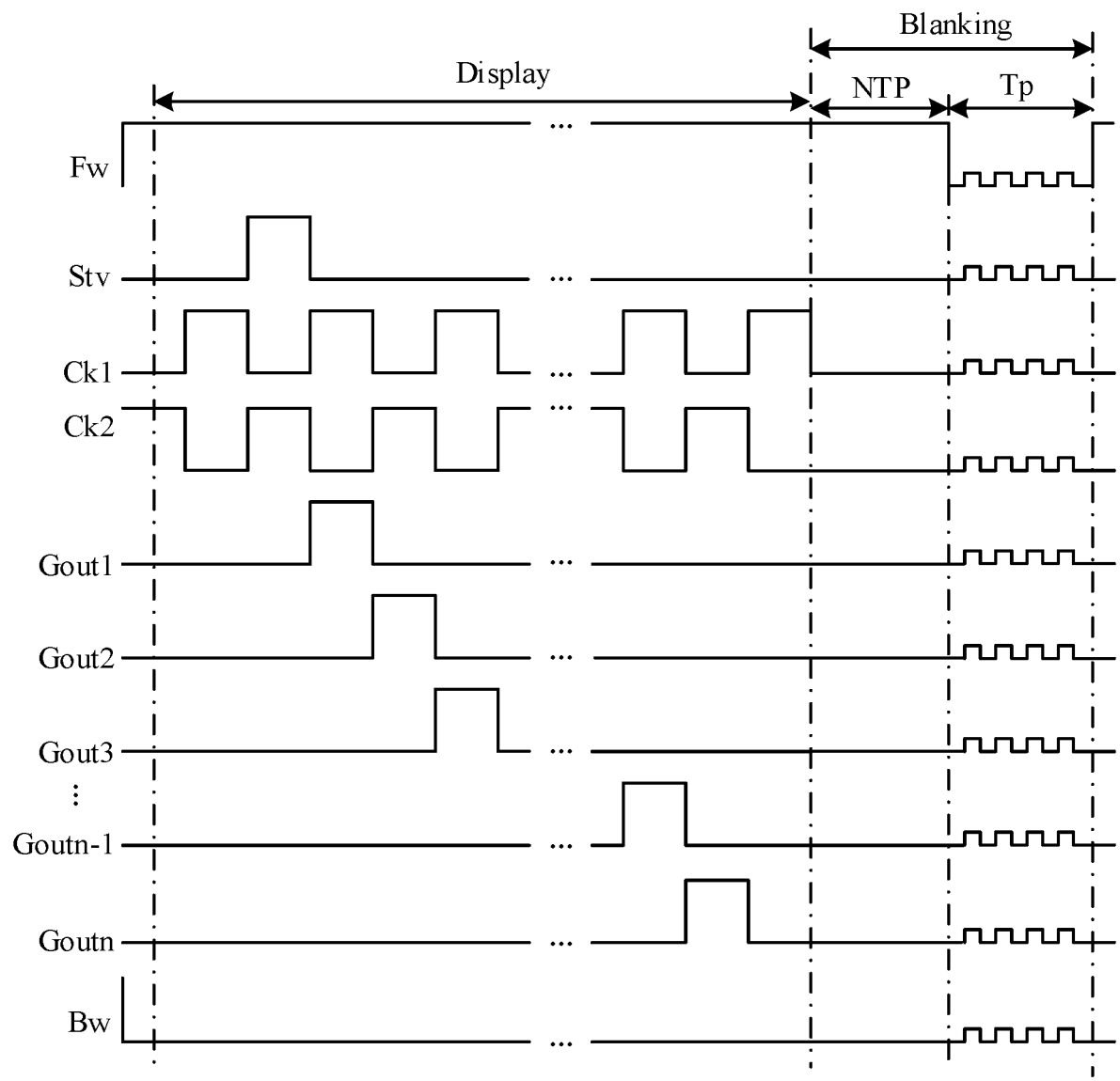
FIG. 13 is a driving timing diagram of another shift register circuit provided by an embodiment of the present disclosure.

Exemplarily, FIG. 13 is a driving timing diagram of another shift register circuit provided by an embodiment of the present disclosure. Referring to FIGS. 10, 11 and 13, the scanning control signal Fw is at an enable level in a non-touch phase NTP of the non-scanning phase Blanking and the scanning control signal Fw is an associated disable level in a touch phase TP of the non-scanning phase Blanking. In this way, it can be ensured that the signal output terminal OUT of each shift register unit 21 outputs the scanning signal Gout stably on the premise of improving the touch accuracy, thereby improving the display effect of the display panel 100.

Figure 14:
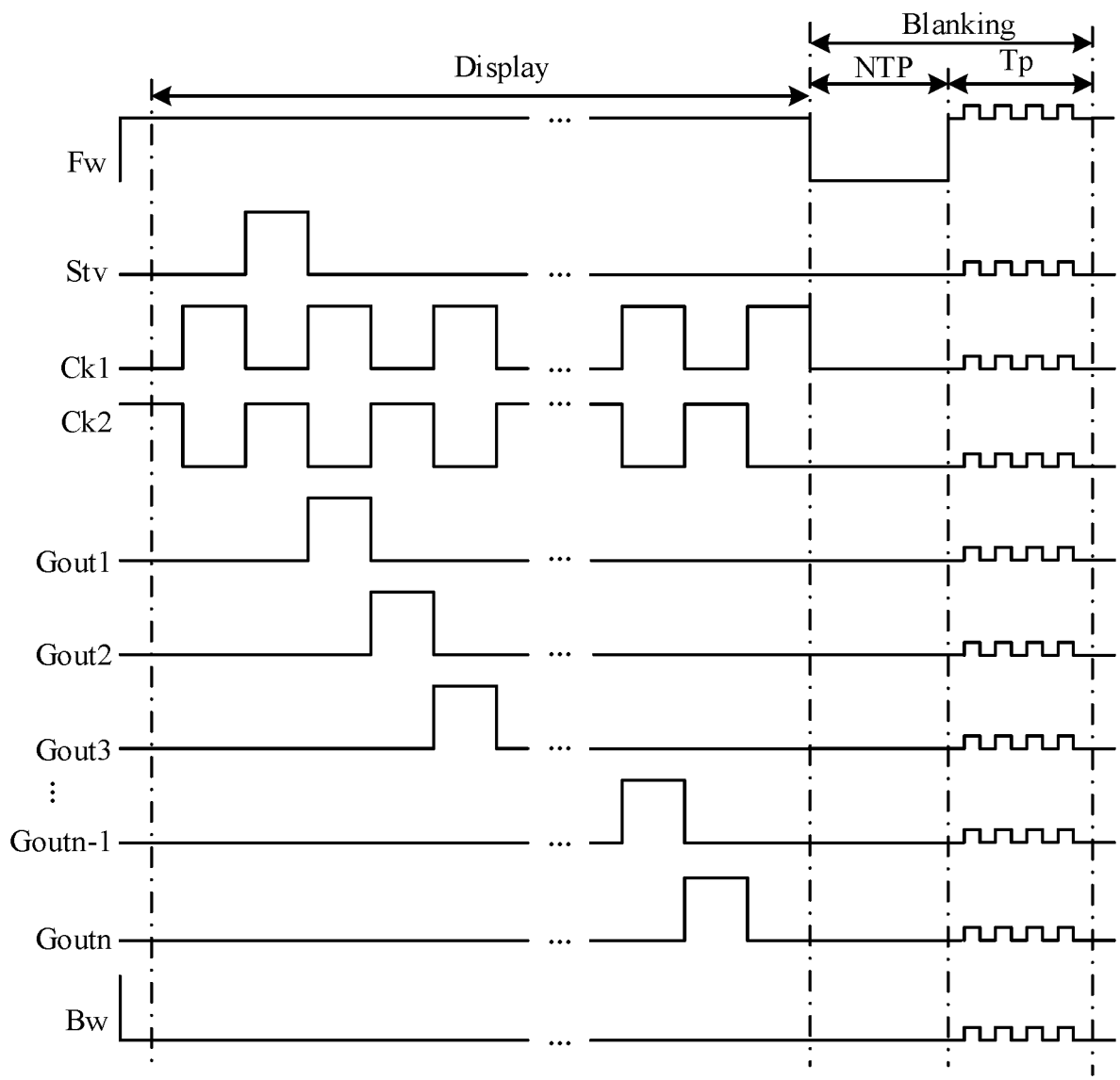
FIG. 14 is a driving timing diagram of another shift register circuit provided by an embodiment of the present disclosure.

It is to be noted that both FIGS. 12 and 13 exemplarily show that in the touch phase TP, the scanning control signal Fw is at a continuous disable level. In the embodiments of the present disclosure, as shown in FIG. 14, the scanning control signal Fw may be at a continuous enable level in the touch phase TP, and the scanning control signal Fw may be at a continuous disable level in the non-touch phase NTP. For ease of description, technical solutions in the embodiments of the present disclosure are exemplarily described by using an example in which the scanning control signal Fw is at a continuous disable level in the touch phase in the embodiments of the present disclosure.

Figure 15:
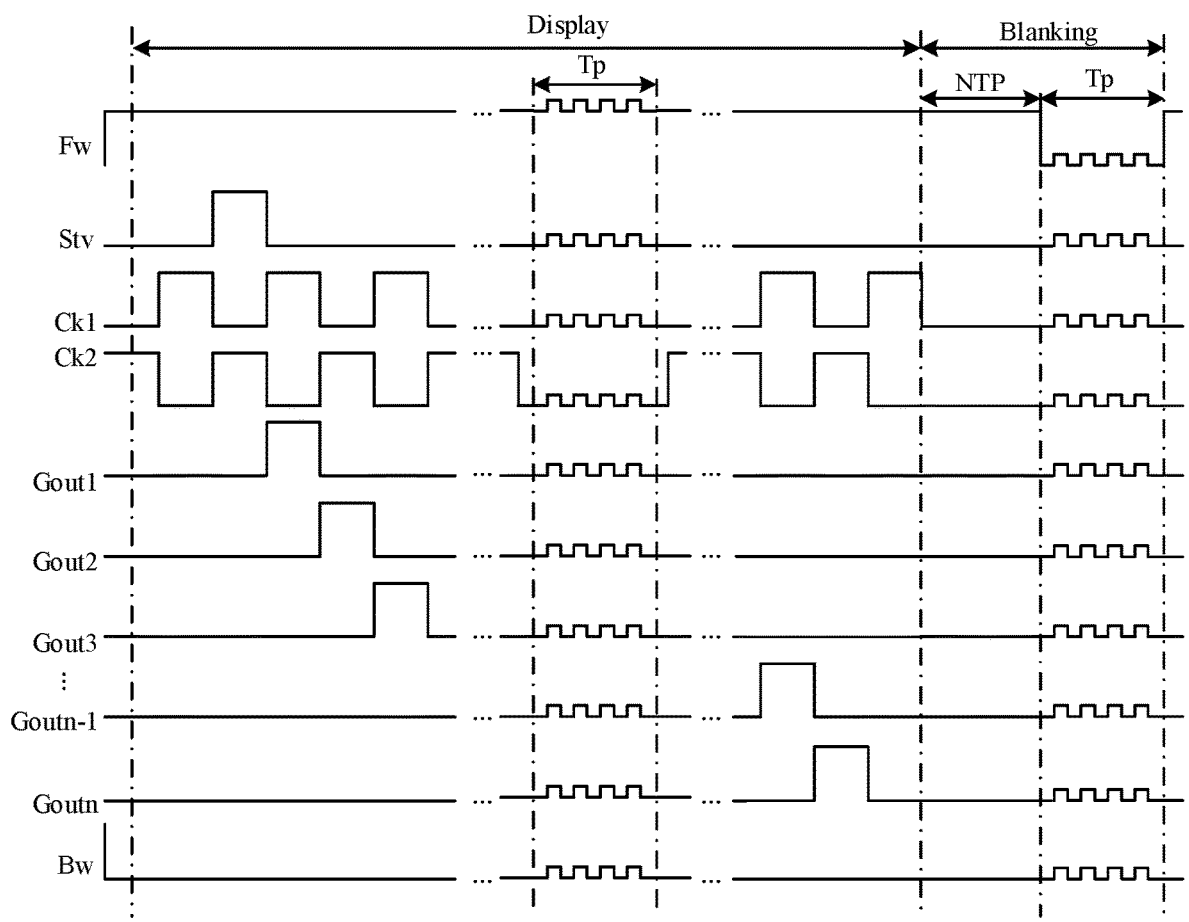
FIG. 15 is a driving timing diagram of another shift register circuit provided by an embodiment of the present disclosure.

It is to be understood that at least two touch phases may be included in one display frame displayed in the display panel, and through the two touch phases, whether a touch object touches the display panel during a current display frame can be at least determined. Exemplarily, as shown in FIG. 15, one display frame includes two touch phases TP, where one touch phase TP is in the scanning phase Display and the other touch phase TP is in the non-scanning phase Blanking. In the touch phase TP of the scanning phase Display, the signal output terminal of each shift register unit is maintained at the disable level of the scanning signal to prevent the touch from interfering with the display.

Figure 16:
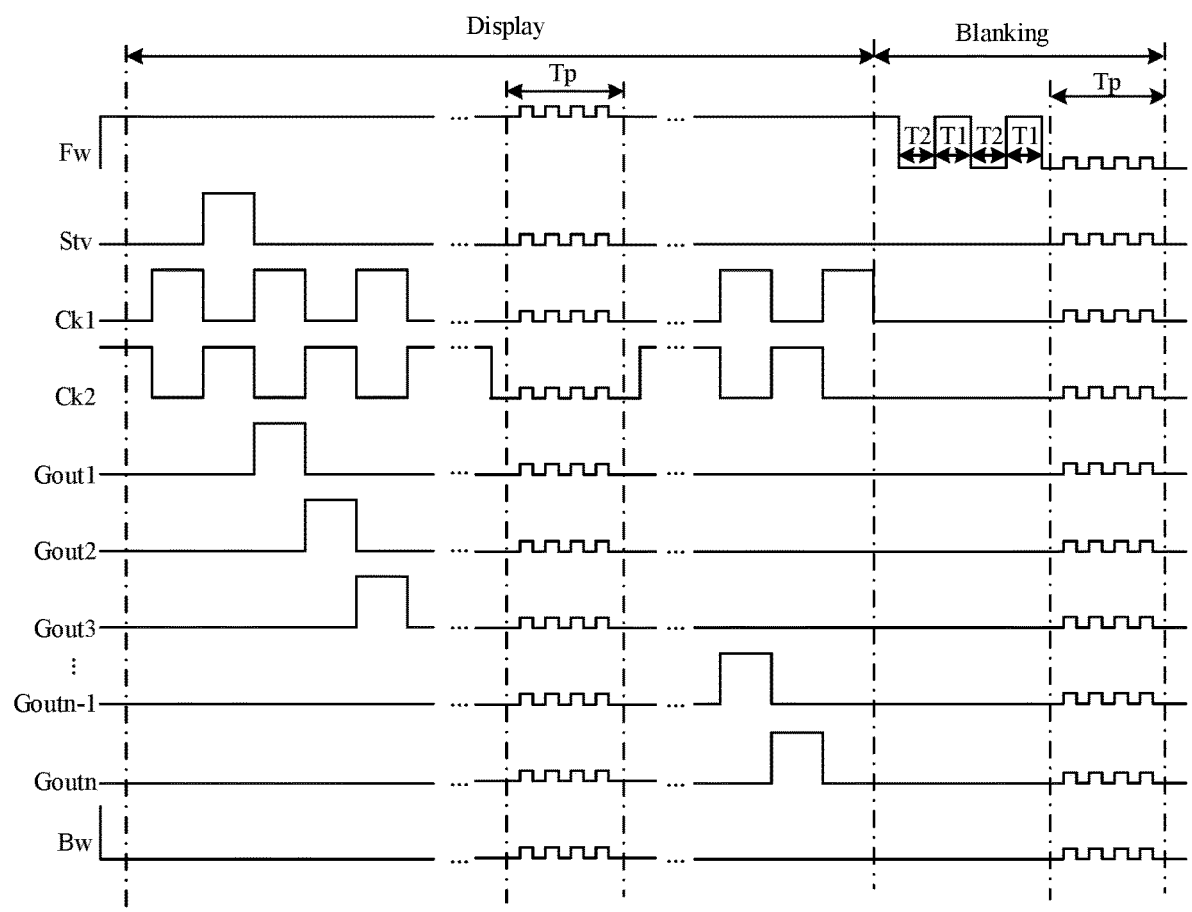
FIG. 16 is a driving timing diagram of another shift register circuit provided by an embodiment of the present disclosure.

FIG. 16 is a driving timing diagram of another shift register circuit provided by an embodiment of the present disclosure. As shown in FIG. 16, in the non-scanning phase Blanking, at least part of the scanning control signal Fw may be a pulse signal including the enable level and the disable level.

Specifically, since turn-on or turn-off of the first transistor is determined by a voltage difference Vgs between a gate and a source of the first transistor, by using an example in which the first transistor is an N-type transistor, when Vgs of the first transistor is greater than a threshold voltage Vth of the first transistor, the first transistor is turned on. However, when a gate voltage Vg of the first transistor is greater than a source voltage Vs of the first transistor for a long time, the first transistor will be in a positive bias state, and the case where the first transistor is in the positive bias state for a long time may affect the first transistor's performance, causing the threshold voltage Vth of the first transistor to drift, and in entering the scanning phase Display again, the first transistor cannot be controlled off at an accurate period, resulting in the output abnormality of the shift register unit. In this way, part of the scanning control signal Fw is provided to be the pulse signal including the enable level and the disable level so that the gate voltage Vg of the first transistor is switched between the enable level and the disable level of the scanning control signal Fw, thereby avoiding the adverse effect caused by the first transistor being in the positive bias state for a long time and further enabling each shift register unit to output the accurate scanning signal In the pulse signal of the scanning control signal Fw, the enable level and the disable level are cyclically changed, and the pulse cycle of the pulse signal is T1+T2. Each shift register unit further includes a clock signal terminal. The clock signal terminal is configured to receive a clock signal Ck; and a frequency of the clock signal Ck is F1 and a value range of a frequency of the pulse signal may be F2, where $0.5F1 \leq F2 \leq 2F1$. In this way, the pulse signal can be ensured to have a relatively high frequency, thereby shortening the time of the first transistor in a certain state.

Figure 17:
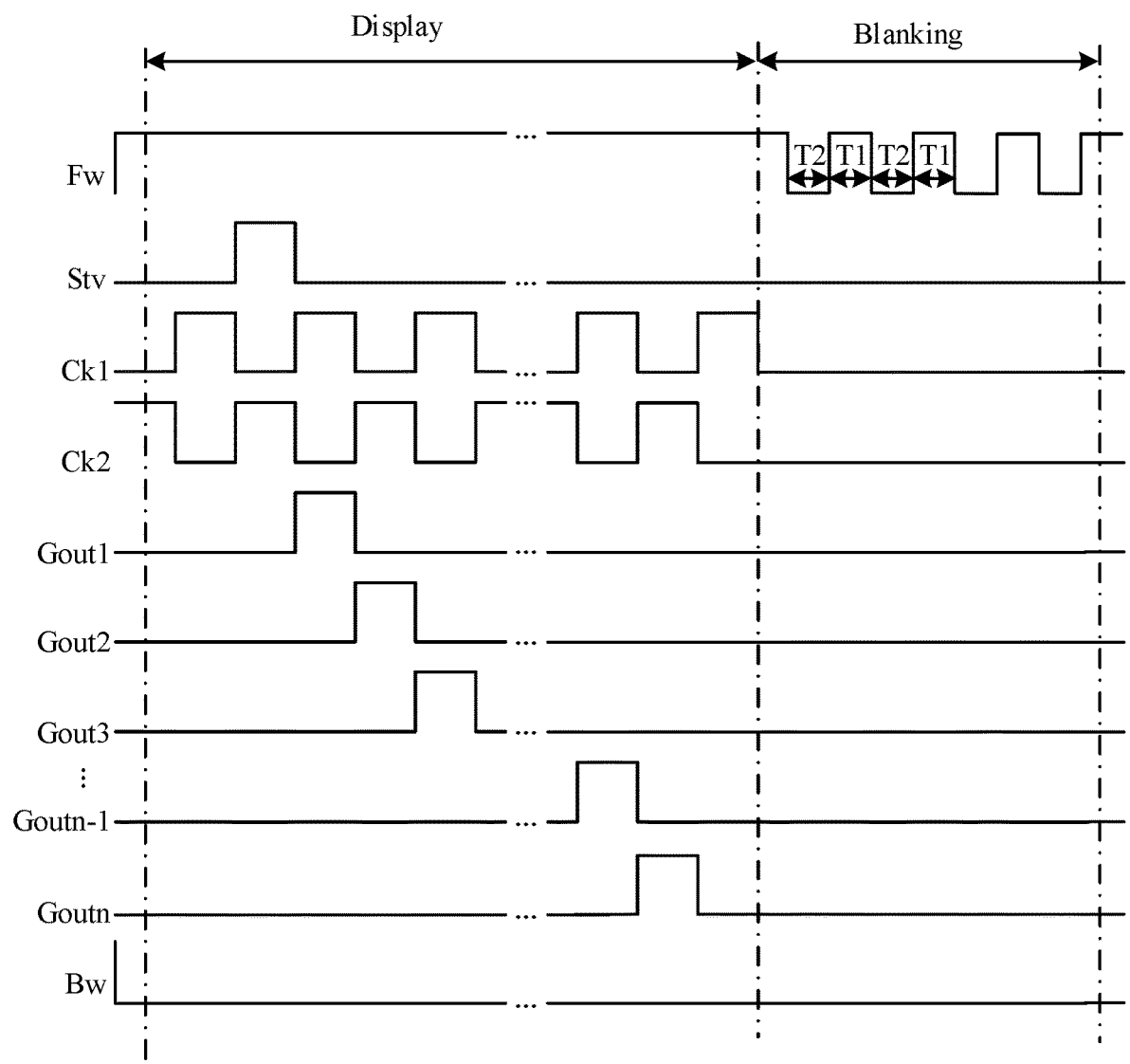
FIG. 17 is a driving timing diagram of another shift register circuit provided by an embodiment of the present disclosure.

In addition, as shown in FIG. 17, without considering the touch, in the entire non-scanning phase, the scanning control signal Fw is a pulse signal in which the enable level and the non-enabling level are alternated, so that the first transistor can be alternately switched between the on state and the off state in the non-scanning phase.

Based on the same inventive concept, embodiments of the present disclosure also provide a driving method of the display panel provided by the embodiments of the present disclosure so that the driving method of the display panel provided by the embodiments of the present disclosure has a working process of the above display panel provided by the embodiments of the present disclosure, and can achieve the beneficial effects of the display panel provided in the embodiments of the present disclosure. Similarities may be referred to the preceding description of the display panel provided in the embodiments of the present disclosure.

Figure 18:
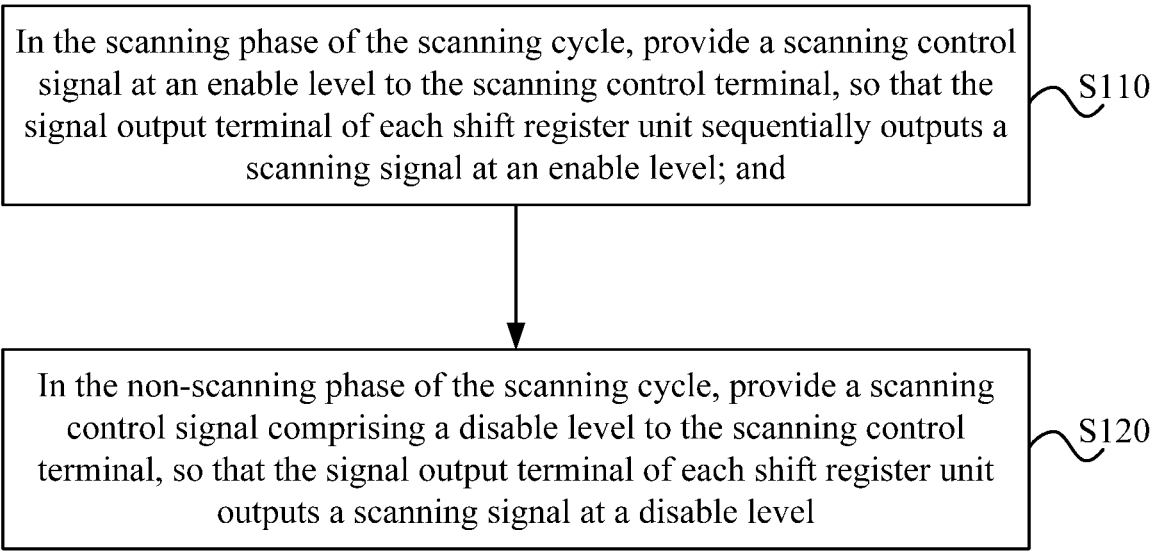
FIG. 18 is a flowchart of a driving method of a display panel provided by an embodiment of the present disclosure.

FIG. 18 is a flowchart of a driving method of a display panel provided by an embodiment of the present disclosure. The driving method of the display panel includes a plurality of frames, each frame including a scanning phase and a non-scanning phase. As shown in FIG. 18, the driving method of the display panel includes steps S110 and S120.

In S110, in the scanning phase of the frame, a scanning control signal at an enable level is provided for the scanning control terminal, so that a signal output terminal of each shift register unit sequentially outputs a scanning signal at an enable level.

In S120, in the non-scanning phase of the frame, a scanning control signal including a disable level is provided for the scanning control terminal, and a signal output terminal of each shift register unit outputs a scanning signal at a disable level.

In a case where the thin-film transistor in each pixel of the display panel is an N-type transistor, the enable level of the scanning signal is a high level capable of controlling the N-type transistor to be on, and the disable level of the scanning signal is a low level capable of controlling the N-type transistor to be off. In a case where the thin-film transistor in each pixel of the display panel is a P-type transistor, the enable level of the scanning signal is a low level capable of controlling the P-type transistor to be on, and the disable level of the scanning signal is a high level capable of controlling the P-type transistor to off. Similarly, in a case where the first transistor M1 is an N-type transistor, the enable level of the scanning control signal is a high level capable of controlling the first transistor to be on, and the disable level of the scanning control signal is a low level capable of controlling the first transistor to be off; in a case where the first transistor is the P-type transistor, the enable level of the scanning control signal is a low level capable of controlling the first transistor to be on, and the disable level of the scanning control signal is a high level capable of controlling the first transistor to be off.

In this way, in the scanning phase of the frame, the scanning control signal at the enable level is provided for the scanning control terminal, so that the first transistor in the shift register unit can be on as necessary, and each shift register unit can sequentially output the scanning signal at the enable level to the respective scanning signal line, thereby achieving the progressive scanning function; and in the non-scanning phase of the frame, the scanning control signal including the disable level is provided for the scanning control terminal so as to control the first transistor to be in an off state to reduce the discharge amount of the first transistor to the second node and/or the signal output terminal and reduce the loss amount of charges at the second node and/or the signal output terminal, ensuring that the scanning signal output from the signal output terminal of each shift register unit in the non-scanning phase can be maintained at the disable level for a long time, avoiding the output abnormality of the signal output terminal of each shift register unit, and further improving the display quality of the display panel.

Figure 19:
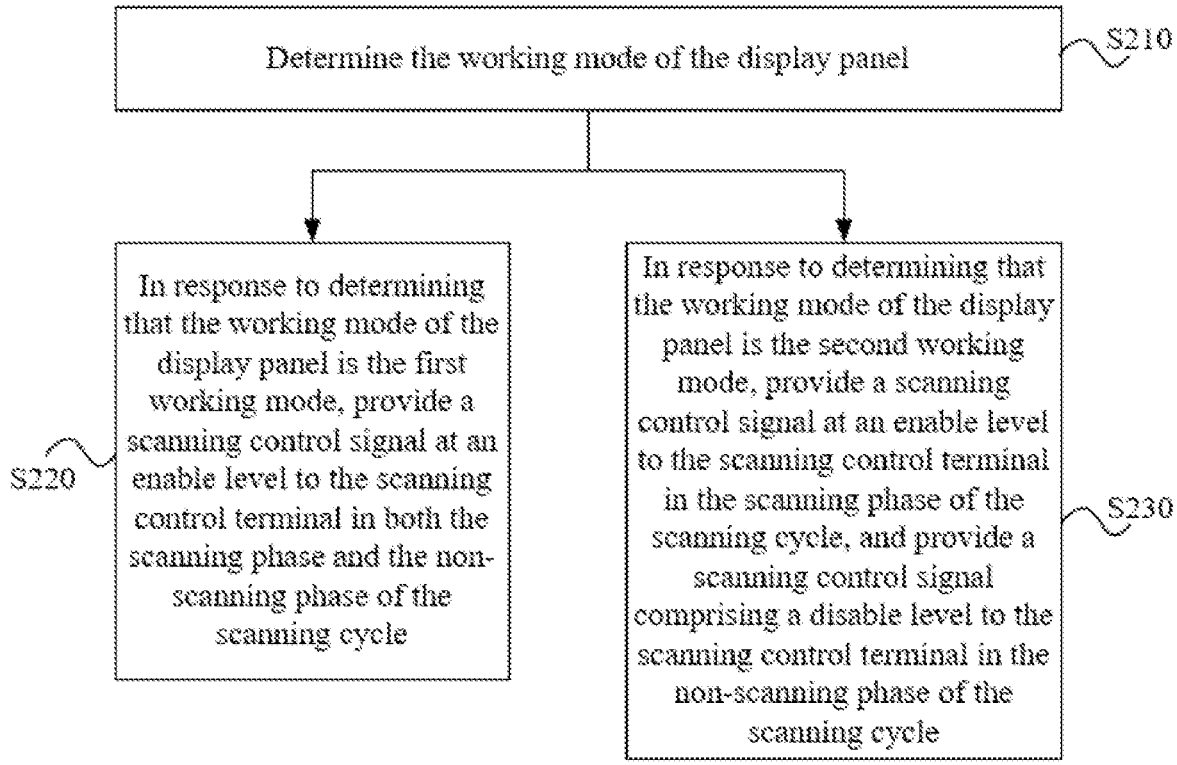
FIG. 19 is a flowchart of another driving method of a display panel provided by an embodiment of the present disclosure.

The display panel may include two working modes, i.e., a first working mode and a second working mode, and a scanning frequency in the first working mode is greater than a scanning frequency in the second working mode. In this case, before the scanning control signal is provided for the scanning control terminal, the working mode of the display panel is also acquired to determine the current working mode of the display panel, and then determine to provide the scanning control signal for the scanning control terminal. Correspondingly, FIG. 19 is a flowchart of another driving method of a display panel provided by an embodiment of the present disclosure, as shown in FIG. 19, the driving method of the display panel includes steps described below.

In S210, a working mode of the display panel is determined.

In S220, in response to determining that the working mode of the display panel is a first working mode, a scanning control signal at an enable level is provided for a scanning control terminal in each of the scanning phase and the non-scanning phase in the frame.

In S230, in response to determining that the working mode of the display panel is the second working mode, the scanning control signal at the enable level is provided for the scanning control terminal in the scanning phase of the frame, and the scanning control signal including the disable level is provided for the scanning control terminal in the non-scanning phase of the frame.

Specifically, since when the display panel displays in the first working mode, a scanning frequency is relatively large, the frame is relatively short, the non-scanning phase of each frame is relatively short, and a discharging time of the first transistor at the second node and/or the signal output terminal is relatively short, a potential change at the second node and/or the signal output terminal is relatively small so that the potential change cannot have a relatively large effect on the scanning signal, that is, can not affect the normal display of the display panel. Therefore, on the premise that the display panel can be normally displayed, when the display panel displays in the first working mode, in each of the scanning phase and the non-scanning phase of the frame, the scanning control signal at the enable level is provided for the scanning control terminal to reduce the power consumption of the display panel.

Correspondingly, since when the display panel displays in the second working mode, the scanning frequency is relatively low, the frame is relatively long, the non-scanning phase of each frame is relatively long, and the discharging time of the first transistor at the second node and/or the signal output terminal is relatively long, the potential change at the second node and/or the signal output terminal is relatively lager so as to have a relatively large effect on the scanning signal. Therefore, when the display panel displays in the second working mode, in the scanning phase of the frame, the scanning control signal at the enable level is provided for the scanning control terminal to control the first transistor to be on as needed so as to ensure that each shift register unit can sequentially output the scanning signal at the enable level, thereby achieving the progressive scanning. In the non-scanning phase, the scanning control signal at the disable level is provided for the scanning control terminal to control the first transistor to be in an off state to avoid that the scanning signal output from the signal output terminal is affected due to the first transistor discharging at the second node and/or the signal output terminal for a long time, thereby improving the display effect of the display panel.

In the non-scanning phase of the frame, the scanning control signal including the enable level may be provided for the scanning control terminal. In this way, in a case where the scanning control signal at the disable level is provided for the scanning control terminal, the first transistor is in the off state, and in a case where the scanning control signal at the enable level is provided for the scanning control terminal, the first transistor is in an on state, so that the discharge amount of the first transistor to the second node and/or the signal output terminal can be reduced compared with the case where the first transistor is always in the on state in the entire non-scanning phase. In this case, the stability of the scanning signal output from the signal output terminal of each shift register unit can be ensured, thereby improving the display effect of the display panel. Meanwhile, when the scanning control signal provided for the scanning control terminal includes the enable level and the disable level in the non-scanning phase, the first transistor can be switched between the on state and the off state, avoiding the following problem: when the first transistor is in a certain state for a long period of time, threshold drifting would occur in the first transistor, which affects the signal output of the shift register unit in the next frame.

In an embodiment, in the non-scanning phase of the frame, the driving method of the display panel may specifically include: in at least part of the non-scanning phase, providing a pulse signal including the enable level and the disable level for the scanning control terminal. In this way, a part of the scanning control signals Fw are configured to be the pulse signal including the enable level and the disable level, so that a gate voltage of the first transistor is switched between the enabled level and the disabled level of the scanning control signal, thereby avoiding the adverse effect caused by the first transistor being in a positive bias state for a long time and further enabling each shift register unit to output the accurate scanning signal.

In an embodiment, in a case where each shift register unit further includes a clock signal terminal, in the scanning phase, a clock signal is also provided for the clock signal terminal. A frequency of the clock signal is F1; and a value range of a frequency of the pulse signal may be F2, where $0.5F1 \leq F2 \leq 2F1$, so that the pulse signal has a relatively high frequency, and a switching rate of the first transistor between the on state and the off state is accelerated, thereby shortening the time of the first transistor in a certain state (the on or off state).

In a case where the display panel may further include multiple touch electrodes, the non-scanning phase may further include a touch phase; in the touch phase, a scanning control signal at a continuous enable level or a continuous disable level is provided for the scanning control terminal; and each of the multiple touch electrodes receives and/or transmits a touch signal. In this way, the touch misjudgment caused by the scanning control signal provided for the scanning control terminal having a large fluctuation can be avoided, thereby further improving the touch accuracy.

Based on the same inventive concept, an embodiment of the present disclosure also provides a display device. The display device includes a driver chip and a display panel provided by the embodiments of the present disclosure. The driver chip is configured to execute the driving method of the display panel provided by the embodiments of the present disclosure. Therefore, the display device has the technical features of the display panel and the method for driving the same provided in the embodiments of the present disclosure and can achieve the beneficial effects of the display panel and the driving method provided in the embodiments of the present disclosure. Similarities may be referred to the preceding description of the display panel and the driving method provided in the embodiments of the present disclosure and are not repeated herein.

Figure 20:
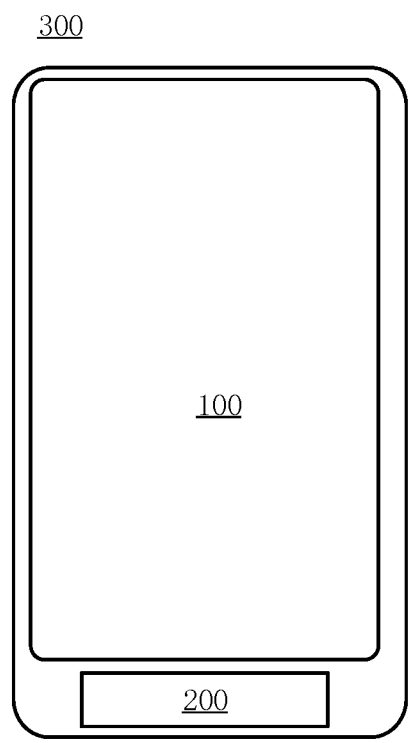
FIG. 20 is a structural diagram of a display device provided by an embodiment of the present disclosure.

Exemplarily, FIG. 20 is a structural diagram of a display device provided by an embodiment of the present disclosure. As shown in FIG. 20, the display device 300 includes the above display panel 100 and a driver chip 200. The display device 300 provided by the embodiments of the present disclosure may be any electronic product with display function, including but not limited to the following categories: phone, television, laptop, desktop display, tablet computer, digital camera, smart bracelet, smart glasses, vehicle-mounted display, medical equipment, industrial control equipment, touch interactive terminal, etc, and no special limitations are made thereto in the embodiments of the present disclosure.

It is to be noted that the preceding are only preferred embodiments of the present disclosure and technical principles used therein. It is to be understood by those skilled in the art that the present disclosure is not limited to the embodiments described herein. For those skilled in the art, various apparent modifications, adaptations, combinations, and substitutions can be made without departing from the scope of the present disclosure. Therefore, while the present disclosure has been described in detail via the preceding embodiments, the present disclosure is not limited to the preceding embodiments and may include more equivalent embodiments without departing from the inventive concept of the present disclosure. The scope of the present disclosure is determined by the scope of the appended claims.

What is claimed is:

1. A display panel, comprising:
   a display area, in which a plurality of scanning signal lines are provided; and
   a non-display area, in which a shift register circuit is provided,
   wherein the shift register circuit comprises a plurality of cascaded shift register units, and each of the plurality of shift register units comprises a scanning control terminal, a signal output terminal, a first level signal terminal, a pull-down module and a pull-down control module;
   wherein in one of the plurality of shift register units, the pull-down module is electrically connected to a first node, a second node, the first level signal terminal and the signal output terminal separately;
   the pull-down module is configured to transmit a first level signal of the first level signal terminal to the second node and the signal output terminal under the control of a potential of the first node; the pull-down module comprises at least a first transistor; a gate of the first transistor is electrically connected to the first node; the pull-down control module is electrically connected to the first node and the scanning control terminal separately; and the pull-down control module is configured to control a scanning control signal of the scanning control terminal to be transmitted to the first node;
   wherein in a scanning phase of a frame, the scanning control signal is at an enable level controlling the first transistor to be turned on; in a non-scanning phase of the frame, the scanning control signal comprises a disable level controlling the first transistor to be turned off; and
   wherein the signal output terminal of the each of the plurality of shift register units is electrically connected to a respective one of the plurality of scanning signal lines; in the scanning phase, the signal output terminal of the each of the plurality of shift register units sequentially outputs a scanning signal at an enable level; and in the non-scanning phase, the signal output terminal of the each of the plurality of shift register units outputs a scanning signal at a disable level.

2. The display panel of claim 1, wherein the pull-down module further comprises a second transistor, and a gate of the second transistor is electrically connected to the first node;
   wherein in one of the plurality of shift register units, a first pole of the first transistor and a first pole of the second transistor are both electrically connected to the first level signal terminal; one of a second pole of the first transistor and a second pole of the second transistor is electrically connected to the second node, and the other of the second pole of the first transistor and the second pole of the second transistor is electrically connected to the signal output terminal; and
   wherein a channel type of the first transistor is the same as a channel type of the second transistor.

3. The display panel of claim 1, further comprising: a start-up signal line,
   wherein the each of the plurality of shift register units further comprises an input module, an output module, a storage capacitor, a signal input terminal, and a clock signal terminal;
   wherein in one of the plurality of shift register units, the input module is electrically connected to the scanning control terminal, the signal input terminal, and the second node separately; the input module is configured to transmit the scanning control signal of the scanning control terminal to the second node under the control of an input signal of the signal input terminal; the storage capacitor is electrically connected between the second node and the signal output terminal; the output module is electrically connected to the second node, the clock signal terminal, and the signal output terminal separately; the output module is configured to transmit a clock signal of the clock signal terminal to the signal output terminal under the control of a potential of the second node; and
   wherein a signal input terminal of a first cascade shift register unit of the plurality of shift register units is electrically connected to the start-up signal line, and a signal input terminal of each of a second cascade shift register unit to a last cascade shift register unit of the plurality of shift register units is electrically connected to a signal output terminal of a previous stage shift register unit.

4. The display panel of claim 1, wherein the each of the plurality of shift register units further comprises a pull-up module; and
   wherein the pull-up module is electrically connected to the pull-down control module, the first node, the second node, and the first level signal terminal separately; and the pull-up module is configured to transmit the first level signal to the first node and the pull-down control module separately under the control of a potential of the second node.

5. The display panel of claim 4, wherein the pull-down control module comprises a third transistor and a fourth transistor; and
   wherein a first pole of the third transistor, a gate of the fourth transistor, and a first pole of the fourth transistor are all electrically connected to the scanning control terminal; a second pole of the third transistor is electrically connected to the first node; and a gate of the third transistor is electrically connected to a second pole of the fourth transistor and the pull-up module separately.

6. The display panel of claim 1, wherein in the non-scanning phase, the scanning control signal further comprises an enable level controlling the first transistor to be turned on.

7. The display panel of claim 6, wherein in the non-scanning phase, at least part of the scanning control signal is a pulse signal comprising an enable level and a disable level.

8. The display panel of claim 7, wherein the each of the plurality of shift register units further comprises a clock signal terminal configured to receive a clock signal; and
   wherein a frequency of the clock signal is F1; and a frequency of the pulse signal is F2, wherein $0.5F1 \le F2 \le 2F1$.

9. The display panel of claim 1, further comprising: a plurality of touch electrodes,
wherein the non-scanning phase comprises a touch phase; and in the touch phase, each of the plurality of touch electrodes receives and/or transmits a touch signal, and the scanning control signal is a continuous enable level or a continuous disable level.

10. The display panel of claim 1, wherein a working mode of the display panel comprises a first working mode and a second working mode; and a scanning frequency in the first working mode is greater than a scanning frequency in the second working mode;
wherein in a case where the working mode of the display panel is the first working mode, in each of the scanning phase and the non-scanning phase of the frame, the scanning control signal is at the enable level controlling the first transistor to be turned on; and
in a case where the working mode of the display panel is a second working mode, in the scanning phase of the frame, the scanning control signal is at the enable level controlling the first transistor to be turned on, and in the non-scanning phase of the frame, the scanning control signal comprises the disable level controlling the first transistor to be turned off.

11. A method for driving a display panel, wherein the display panel comprises:
a display area, in which a plurality of scanning signal lines are provided; and
a non-display area, in which a shift register circuit is provided,
wherein the shift register circuit comprises a plurality of cascaded shift register units, and each of the plurality of shift register units comprises a scanning control terminal, a signal output terminal, a first level signal terminal, a pull-down module and a pull-down control module;
wherein in the each of the plurality of shift register units, the pull-down module is electrically connected to a first node, a second node, the first level signal terminal and the signal output terminal separately; the pull-down module is configured to transmit a first level signal of the first level signal terminal to the second node and the signal output terminal under the control of a potential of the first node; the pull-down module comprises at least a first transistor; a gate of the first transistor is electrically connected to the first node; the pull-down control module is electrically connected to the first node and the scanning control terminal separately; and the pull-down control module is configured to control a scanning control signal of the scanning control terminal to be transmitted to the first node;
wherein the signal output terminal of the each of the plurality of shift register units is electrically connected to a respective one of the plurality of scanning signal lines;
wherein the method comprises a plurality of frames, and each of the plurality of frames comprises a scanning phase and a non-scanning phase; and wherein the method comprises:
in the scanning phase, providing, to the scanning control terminal, a scanning control signal at an enable level controlling the first transistor to be turned on, so that the signal output terminal of each of the plurality of shift register units sequentially outputs a scanning signal at an enable level; and
in the non-scanning phase, providing, to the scanning control terminal, a scanning control signal comprising a disable level controlling the first transistor to be turned off, so that the signal output terminal of each of the plurality of shift register units outputs a scanning signal at a disable level.

12. The method of claim 11, further comprising:
in the non-scanning phase, providing a scanning control signal comprising an enable level to the scanning control terminal.

13. The method of claim 12, wherein the providing a scanning control signal comprising an enable level to the scanning control terminal in the non-scanning phase comprises:
in at least part of the non-scanning phase, providing a pulse signal comprising an enable level and a disable level to the scanning control terminal.

14. The method of claim 13, wherein each of the plurality of shift register units further comprises a clock signal terminal; and
the method further comprises:
in the scanning phase, providing a clock signal to the clock signal terminal,
wherein a frequency of the clock signal is F1; and a frequency of the pulse signal is F2, wherein $0.5F1 \leq F2 \leq 2F1$.

15. The method of claim 13, wherein the display panel further comprises a plurality of touch electrodes, and the non-scanning phase further comprises a touch phase; and
wherein the method further comprises:
in the touch phase, providing a scanning control signal at a continuous enable level or a continuous disable level to the scanning control terminal, wherein each of the plurality of touch electrodes receives and/or transmits a touch signal.

16. The method of claim 11, wherein a working mode of the display panel comprises a first working mode and a second working mode; a scanning frequency in the first working mode is greater than a scanning frequency in the second working mode; and
wherein before providing the scanning control signal to the scanning control terminal, the method further comprises:
determining a working mode of the display panel;
in response to determining that the working mode of the display panel is the first working mode, providing a scanning control signal at an enable level to the scanning control terminal in each of the scanning phase and the non-scanning phase; and
in response to determining that the working mode of the display panel is the second working mode, providing a scanning control signal at an enable level to the scanning control terminal in the scanning phase, and providing a scanning control signal comprising a disable level to the scanning control terminal in the non-scanning period.

17. A display device, comprising a driver chip and a display panel, wherein the display panel comprises:
a display area, in which a plurality of scanning signal lines are provided; and
a non-display area, in which a shift register circuit is provided,
wherein the shift register circuit comprises a plurality of cascaded shift register units, and each of the plurality of shift register units comprises a scanning control terminal, a signal output terminal, a first level signal terminal, a pull-down module and a pull-down control module;

wherein in the each of the plurality of shift register units, the pull-down module is electrically connected to a first node, a second node, the first level signal terminal and the signal output terminal separately; the pull-down module is configured to transmit a first level signal of the first level signal terminal to the second node and the signal output terminal under the control of a potential of the first node; the pull-down module comprises at least a first transistor; a gate of the first transistor is electrically connected to the first node; the pull-down control module is electrically connected to the first node and the scanning control terminal separately; and the pull-down control module is configured to control a scanning control signal of the scanning control terminal to be transmitted to the first node;

wherein the signal output terminal of the each of the plurality of shift register units is electrically connected to a respective one of the plurality of scanning signal lines;

wherein the driver chip is configured to execute a method, wherein the method comprises a plurality of frames, and each of the plurality of frames comprises a scanning phase and a non-scanning phase; and wherein the method comprises:

in the scanning phase, providing, to the scanning control terminal, a scanning control signal at an enable level controlling the first transistor to be turned on, so that the signal output terminal of each of the plurality of shift register units sequentially outputs a scanning signal at an enable level; and in the non-scanning phase, providing, to the scanning control terminal, a scanning control signal comprising a disable level controlling the first transistor to be turned off, so that the signal output terminal of each of the plurality of shift register units outputs a scanning signal at a disable level.

\* \* \* \* \*